(12) United States Patent
Katou

(10) Patent No.: US 11,342,826 B2
(45) Date of Patent: May 24, 2022

(54) ROTATING ELECTRIC MACHINE

(71) Applicant: DENSO CORPORATION, Kariya (JP)

(72) Inventor: Hidenori Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 222 days.

(21) Appl. No.: 16/851,413

(22) Filed: Apr. 17, 2020

(65) Prior Publication Data

US 2020/0336058 A1 Oct. 22, 2020

(30) Foreign Application Priority Data

Apr. 22, 2019 (JP) .............................. JP2019-081377

(51) Int. Cl.
*H02K 29/03* (2006.01)
*H02K 1/14* (2006.01)
*H02K 1/27* (2022.01)
*H02K 3/28* (2006.01)
*H02K 3/52* (2006.01)
*H02K 11/33* (2016.01)
*H02K 21/16* (2006.01)
*H02K 24/00* (2006.01)
*H02K 1/276* (2022.01)

(52) U.S. Cl.
CPC ............. *H02K 29/03* (2013.01); *H02K 1/146* (2013.01); *H02K 1/276* (2013.01); *H02K 3/28* (2013.01); *H02K 3/522* (2013.01); *H02K 11/33* (2016.01); *H02K 21/16* (2013.01); *H02K 24/00* (2013.01); *H02K 2203/06* (2013.01); *H02K 2213/03* (2013.01)

(58) Field of Classification Search
CPC ........ H02K 29/03; H02K 3/522; H02K 11/33; H02K 24/00; H02K 1/146; H02K 3/28; H02K 1/276; H02K 21/16; H02K 2213/03; H02K 2203/06
USPC ............................................................ 310/51
See application file for complete search history.

(56) References Cited

U.S. PATENT DOCUMENTS

| | | | |
|---|---|---|---|
| 2009/0224627 A1* | 9/2009 | Hino ........................ | B60L 1/02 |
| | | | 310/216.077 |
| 2012/0043847 A1* | 2/2012 | Miyata ................... | H02K 19/12 |
| | | | 310/195 |
| 2014/0191628 A1* | 7/2014 | Nakano ................ | H02K 11/225 |
| | | | 310/68 B |

(Continued)

FOREIGN PATENT DOCUMENTS

JP  5905176 B2  4/2016

*Primary Examiner* — Alex W Mok
(74) *Attorney, Agent, or Firm* — Maschoff Brennan

(57) ABSTRACT

A rotating electric machine includes coil bodies formed as a first stator winding wound on first teeth, other coil bodies formed as a second stator winding wound on second teeth, and yet other coil bodies formed as the first stator winding and the second stator winding wound on third teeth. A phase difference between an electric current in the first stator winding wound on the third teeth and an electric current in the second stator winding wound on the third teeth is set so that respective phase differences of magnetomotive forces of the other coil bodies in three phases with respect to respective magnetomotive forces of the coil bodies in three phases and respective phase differences of magnetomotive forces of the yet other coil bodies in three phases with respect to respective magnetomotive forces of the other coil bodies in three phases are 20 degrees in electric angle.

15 Claims, 16 Drawing Sheets

(56) References Cited

U.S. PATENT DOCUMENTS

| | | | |
|---|---|---|---|
| 2015/0333586 A1* | 11/2015 | Hirotani | H02K 1/278 |
| | | | 310/68 D |
| 2017/0093242 A1 | 3/2017 | Hirotani et al. | |
| 2018/0115202 A1* | 4/2018 | Hirotani | H02K 1/2706 |
| 2018/0248432 A1* | 8/2018 | Ikeda | H02K 3/28 |

* cited by examiner

FIG. 4

MAG POLE:14, SLOT:18, CUR PH DIFF:20 deg, TOTAL PH DIFF:80 deg

| TEETH | WND SEC | COIL | ELE ANG |
|---|---|---|---|
| T1 | +U11 | +Ua | 0 |
| T2 | +V21 | +Vb | 140 |
| T3 | +W11／−V22 | +Wc | 280 |
| T4 | −W12 | −Wa | 60 |
| T5 | −U21 | −Ub | 200 |
| T6 | −V11／+U22 | −Vc | 340 |
| T7 | +V12 | +Va | 120 |
| T8 | +W21 | +Wb | 260 |
| T9 | +U12／−W22 | +Uc | 40 |
| T10 | −U13 | −Ua | 180 |
| T11 | −V23 | −Vb | 320 |
| T12 | −W13／+V24 | −Wc | 100 |
| T13 | +W14 | +Wa | 240 |
| T14 | +U23 | +Ub | 20 |
| T15 | +V13／−U24 | +Vc | 160 |
| T16 | −V14 | −Va | 300 |
| T17 | −W23 | −Wb | 80 |
| T18 | −U14／+W24 | −Uc | 220 |

FIG. 10

MAG POLE:14, SLOT:18, CUR PH DIFF:20 deg, TOTAL PH DIFF:40 deg

| TEETH | WND SEC | COIL | ELE ANG |
|---|---|---|---|
| T1 | +U11 | +Ua | 0 |
| T2 | +V21 | +Vb | 140 |
| T3 | +V11／−W21 | +Wc | 280 |
| T4 | −W11 | −Wa | 60 |
| T5 | −U21 | −Ub | 200 |
| T6 | +U12／−V22 | −Vc | 340 |
| T7 | +V12 | +Va | 120 |
| T8 | +W22 | +Wb | 260 |
| T9 | −W12／+U22 | +Uc | 40 |
| T10 | −U13 | −Ua | 180 |
| T11 | −V23 | −Vb | 320 |
| T12 | +V13／−W23 | −Wc | 100 |
| T13 | +W13 | +Wa | 240 |
| T14 | +U23 | +Ub | 20 |
| T15 | −U14／+V24 | +Vc | 160 |
| T16 | −V14 | −Va | 300 |
| T17 | −W24 | −Wb | 80 |
| T18 | +W14／−U24 | −Uc | 220 |

FIG. 13

MAG POLE:14, SLOT:18, CUR PH DIFF:40 deg, TOTAL PH DIFF:80 deg

| TEETH | WND SEC | COIL | ELE ANG |
|---|---|---|---|
| T1 | +U11 | +Ua | 0 |
| T2 | −U12／−W21 | +Vc | 140 |
| T3 | +W22 | +Wb | 280 |
| T4 | −W11 | −Wa | 60 |
| T5 | +W12／+V21 | −Uc | 200 |
| T6 | −V22 | −Vb | 340 |
| T7 | +V11 | +Va | 120 |
| T8 | −V12／−U21 | +Wc | 260 |
| T9 | +U22 | +Ub | 40 |
| T10 | −U13 | −Ua | 180 |
| T11 | +U14／+W23 | −Vc | 320 |
| T12 | −W24 | −Wb | 100 |
| T13 | +W13 | +Wa | 240 |
| T14 | −W14／−V23 | +Uc | 20 |
| T15 | +V24 | +Vb | 160 |
| T16 | −V13 | −Va | 300 |
| T17 | +V14／+U23 | −Wc | 80 |
| T18 | −U24 | −Ub | 220 |

FIG. 14

MAG POLE:14, SLOT:18, CUR PH DIFF:40 deg, TOTAL PH DIFF:40 deg

| TEETH | WND SEC | COIL | ELE ANG |
|---|---|---|---|
| T1 | +U11 | +Ua | 0 |
| T2 | +V11／+V21 | +Vc | 140 |
| T3 | +W21 | +Wb | 280 |
| T4 | −W11 | −Wa | 60 |
| T5 | −U12／−U21 | −Uc | 200 |
| T6 | −V22 | −Vb | 340 |
| T7 | +V12 | +Va | 120 |
| T8 | +W12／+W22 | +Wc | 260 |
| T9 | +U22 | +Ub | 40 |
| T10 | −U13 | −Ua | 180 |
| T11 | −V13／−V23 | −Vc | 320 |
| T12 | −W23 | −Wb | 100 |
| T13 | +W13 | +Wa | 240 |
| T14 | +U14／+U23 | +Uc | 20 |
| T15 | +V24 | +Vb | 160 |
| T16 | −V14 | −Va | 300 |
| T17 | −W14／−W24 | −Wc | 80 |
| T18 | −U24 | −Ub | 220 |

FIG. 15

| # OF MAG POLES | | | 22 | |
|---|---|---|---|---|
| # OF SLOTS | | | 18 | |
| CUR PH DIFF | 20deg | | | 40deg |
| TOTAL PH DIFF | 80deg | 40deg | 80deg | 40deg |
| TEETH T1 | +U11 | +U11 | +U11 | +U11 |
| TEETH T2 | -U12/+W21 | +W11/-U21 | -U21 | -U21 |
| TEETH T3 | -W22 | -W21 | +V11/+U22 | -W11/-W21 |
| TEETH T4 | -V11 | -V11 | -V12 | -V11 |
| TEETH T5 | +V12/-U21 | -U12/+V21 | +V21 | +V21 |
| TEETH T6 | +U22 | +U22 | -W11/-W22 | +U12/+U22 |
| TEETH T7 | +W11 | +W12 | +W12 | +W12 |
| TEETH T8 | -W12/+V21 | +V12/-W22 | -W21 | -W22 |
| TEETH T9 | -V22 | -V22 | +U12/+W22 | -V12/-V22 |
| TEETH T10 | -U13 | -U13 | -U13 | -U13 |
| TEETH T11 | +U14/-W23 | -W13/+U23 | +U23 | +U23 |
| TEETH T12 | +W24 | +W23 | -V13/-U24 | +W13/+W23 |
| TEETH T13 | +V13 | +V13 | +V14 | +V13 |
| TEETH T14 | -V14/+U23 | +U14/-V23 | -V23 | -V23 |
| TEETH T15 | -U24 | -U24 | +W13/+V24 | -U14/-U24 |
| TEETH T16 | -W13 | -W14 | -W14 | -W14 |
| TEETH T17 | +W14/-V23 | -V14/+W24 | +W23 | +W24 |
| TEETH T18 | +V24 | +V24 | -U14/-W24 | +V14/+V24 |

FIG. 16

| # OF MAG POLES | | | 16 | | |
|---|---|---|---|---|---|
| # OF SLOTS | | | 18 | | |
| CUR PH DIFF | | 20deg | | | 40deg |
| TOTAL PH DIFF | 80deg | 40deg | | 80deg | 40deg |
| TEETH T1 | +U11 | +U11 | | +U11 | +U11 |
| TEETH T2 | +V11/−U21 | −U12/+V21 | | +V21 | +V21 |
| TEETH T3 | −V21 | −V22 | | +U12/+W21 | −V11/−V22 |
| TEETH T4 | +V12 | +V11 | | +V11 | +V12 |
| TEETH T5 | +W11/−V22 | −V12/+W21 | | +W22 | +W21 |
| TEETH T6 | −W21 | −W22 | | +V12/+U21 | −W11/−W22 |
| TEETH T7 | +W12 | +W11 | | +W11 | +W12 |
| TEETH T8 | +U12/−W22 | −W12/+U21 | | +U22 | +U21 |
| TEETH T9 | −U22 | −U22 | | +W12/+V22 | −U12/−U22 |
| TEETH T10 | +U13 | +U13 | | +U13 | +U13 |
| TEETH T11 | +V13/−U23 | −U14/+V23 | | +V23 | +V23 |
| TEETH T12 | −V23 | −V24 | | +U14/+W23 | −V13/−V24 |
| TEETH T13 | +V14 | +V13 | | +V13 | +V14 |
| TEETH T14 | +W13/−V24 | −V14/+W23 | | +W24 | +W23 |
| TEETH T15 | −W23 | −W24 | | +V14/+U23 | −W13/−W24 |
| TEETH T16 | +W14 | +W13 | | +W13 | +W14 |
| TEETH T17 | +U14/−W24 | −W14/+U23 | | +U24 | +U23 |
| TEETH T18 | −U24 | −U24 | | +W14/+V24 | −U14/−U24 |

FIG. 17

| # OF MAG POLES | 20 | | | | | |
|---|---|---|---|---|---|---|
| # OF SLOTS | 18 | | | | | |
| CUR PH DIFF | | 20deg | | | 40deg | |
| TOTAL PH DIFF | 80deg | 40deg | | 80deg | 40deg | 40deg |
| TEETH T1 | +U11 | +U11 | | +U11 | +U11 | +U11 |
| TEETH T2 | −U21 | −U21 | | +W11/+V21 | −U12/−U21 | −U12/−U21 |
| TEETH T3 | +U12/−W21 | −W11/+U22 | | +U21 | +U22 | +U22 |
| TEETH T4 | +W11 | +W12 | | +W12 | +W11 | +W11 |
| TEETH T5 | −W22 | −W21 | | +V11/+U22 | −W12/−W21 | −W12/−W21 |
| TEETH T6 | +W12/−V21 | −V11/+W22 | | +W21 | +W22 | +W22 |
| TEETH T7 | +V11 | +V12 | | +V12 | +V11 | +V11 |
| TEETH T8 | −V22 | −V21 | | +U12/+W22 | −V12/−V21 | −V12/−V21 |
| TEETH T9 | +V12/−U22 | −U12/+V22 | | +V22 | +V22 | +V22 |
| TEETH T10 | +U13 | +U13 | | +U13 | +U13 | +U13 |
| TEETH T11 | −U23 | −U23 | | +W13/+V23 | −U14/−U23 | −U14/−U23 |
| TEETH T12 | +U14/−W23 | −W13/+U24 | | +U23 | +U24 | +U24 |
| TEETH T13 | +W13 | +W14 | | +W14 | +W13 | +W13 |
| TEETH T14 | −W24 | −W23 | | +V13/+U24 | −W14/−W23 | −W14/−W23 |
| TEETH T15 | +W14/−V23 | −V13/+W24 | | +W23 | +W24 | +W24 |
| TEETH T16 | +V13 | +V14 | | +V14 | +V13 | +V13 |
| TEETH T17 | −V24 | −V23 | | +U14/+W24 | −V14/−V23 | −V14/−V23 |
| TEETH T18 | +V14/−U24 | −U24/+V24 | | +V24 | +V24 | +V24 |

US 11,342,826 B2

1
ROTATING ELECTRIC MACHINE

CROSS REFERENCE TO RELATED APPLICATION

The present application is based on and claims the benefit of priority of Japanese Patent Application No. 2019-081377, filed on Apr. 22, 2019, the disclosure of which is incorporated herein by reference.

TECHNICAL FIELD

The present disclosure generally relates to a rotating electric machine.

BACKGROUND INFORMATION

Conventionally, a rotating electric machine having a first armature winding to which a three-phase current is supplied from a first inverter and a second armature winding to which a three-phase current is supplied from a second inverter is known. In such a rotating electric machine, when a phase difference of electric currents is generated between the first inverter and the second inverter, an electromagnetic field generated in a gap between a rotor and a stator by the armature winding may become spatially unbalanced, and may cause torque ripple.

Therefore, the rotating electric machine disclosed in a related art includes a coil body formed by the first armature winding and the second armature winding wound around teeth, and another coil body formed by the first armature winding wound around the teeth, and yet another coil body formed by the second armature winding wound around the teeth, and arranges those coil bodies about a center axis of the rotating electric machine in a 2n times rotation symmetry (i.e., "n" is an integer of 1 or more).

In such manner, even if a current phase difference (i.e., a short form of "a phase difference of electric currents" described above) is generated, the electromagnetic field generated in the gap between the rotor and the stator can be spatially balanced, and torque ripple can thus be suppressed. Therefore, vibration and noise, which may have otherwise been caused, are suppressive.

SUMMARY

It is an object of the present disclosure to provide a rotating electric machine which can suppress vibration and noise.

BRIEF DESCRIPTION OF THE DRAWINGS

Objects, features, and advantages of the present disclosure will become more apparent from the following detailed description made with reference to the accompanying drawings, in which:

FIG. 4 is a diagram of an arrangement of winding sections.

2
FIG. 10 is a diagram of an arrangement of the winding sections in a second embodiment;
FIG. 13 is a diagram of an arrangement of the winding sections in a third embodiment;
FIG. 14 is a diagram of an arrangement of the winding sections in a fourth embodiment;
FIG. 15 is a diagram of an arrangement of the winding sections in another example;
FIG. 16 is a diagram of an arrangement of the winding sections in yet another example;
and
FIG. 17 is a diagram of an arrangement of the winding sections in still yet another example.

DETAILED DESCRIPTION

Figure 1:
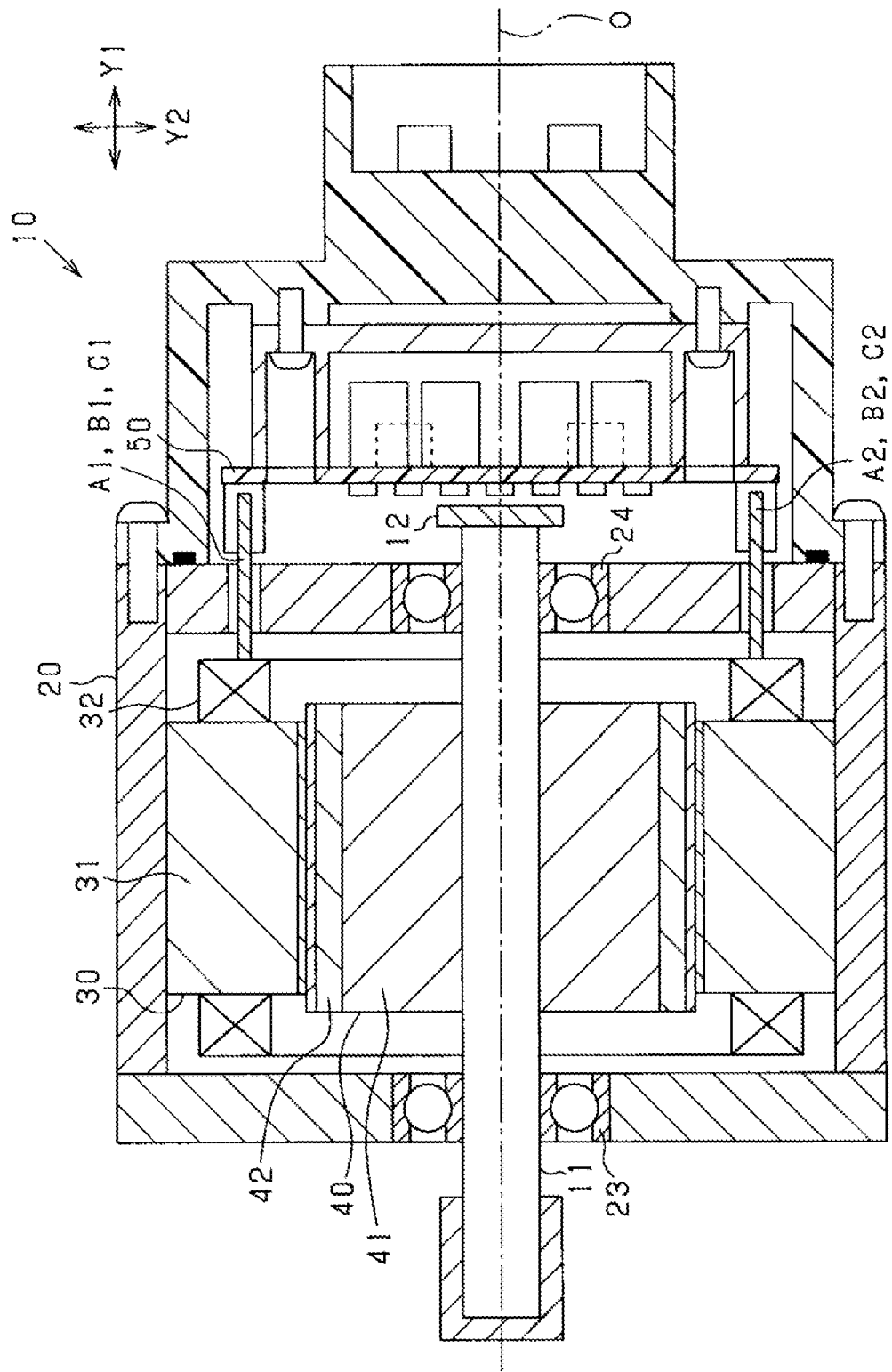
FIG. 1 is a longitudinal cross-sectional view of a motor.

In a rotating electric machine, further suppression of vibration and noise is requested, and it is considered that there may still be room for technical improvement in response to the request.

In one aspect of the present disclosure, for solving the above-described problems, a rotating electric machine is provided with (i) a rotor having a plurality of magnetic poles whose polarities alternate in a circumferential direction, (ii) a multi-phase stator winding, and (iii) a stator with a stator iron core having a plurality of circumferentially-arranged teeth around which the stator winding is wound, respectively, in which (a) the stator winding includes a first stator winding supplied with a three-phase current from a first inverter and a second stator winding supplied with a three-phase current from a second inverter, and (b) both of the three-phase currents supplied from the first and second inverters respectively have a predetermined current phase difference, and (c) a U-phase coil body Ua formed as the first stator winding in a U phase among the three phases wound around first teeth, a V-phase coil body Va formed as the first stator winding in a V phase among the three phases wound around the first teeth, a W-phase coil body Wa formed as the first stator winding in a W phase among the three phases wound around the first teeth, a U-phase coil body Ub formed as the second stator winding in a U phase among the three phases wound around second teeth, a V-phase coil body Vb formed as the second stator winding in a V phase among the three phases wound around the second teeth, a W-phase coil body Wb formed as the second stator winding in a W phase among the three phases wound around the second teeth, a U-phase coil body Uc formed as the first stator winding in any one phase among the three phases and the second stator winding in any one phase among the three phases wound around third teeth, a V-phase coil body Vc formed as the first stator winding in any one phase among the three phases and the second stator winding in any one phase among the three phases wound around the third teeth, and a W-phase coil body Wc formed as the first stator winding in any one phase among the three phases and the second stator winding in any one phase among the three phases wound around the third teeth are provided, and a total phase difference between a magnetomotive force generated by a winding section of the first stator winding wound around the third teeth and a magnetomotive force generated by a winding section of the second stator winding wound around the same third teeth or a total phase difference between an electric current flowing in a winding section of the first stator winding wound around the third teeth and an electric current flowing in a winding section of the second stator winding wound around the same third teeth is set (i.e., adjusted) so that respective (i.e., each of) phase differences of magnetomotive forces (A) between the coil bodies Ua, Va, Wa and the coil bodies Uc, Vc, Wc in respective phases and (B) between the coil bodies Uc, Vc, Wc and the coil bodies Ub, Vb, Wb in respective phases are (i.e., have a value) within a predetermined phase range of electric angle including 20 degrees or respective (i.e., each of) phase differences of magnetomotive forces (A) between the coil bodies Ua, Va, Wa and the coil bodies Ub, Vb, Wb in respective phases and (B) between the coil bodies Ub, Vb, Wb and the coil bodies Uc, Vc, Wc in respective phases are (i.e., are calculated as a value) within a predetermined phase range of electric angle including 20 degrees.

By having both of (a) the respective phase differences between the magnetomotive forces of the coil bodies Ua, Va, Wa and the magnetomotive forces of the coil bodies Uc, Vc, Wc, and (b) the respective phase differences between the magnetomotive forces between the coil bodies Ub, Vb, Wb and the magnetomotive forces of the coil bodies Uc, Vc, Wc within a predetermined phase range, or by having both of (a) the respective phase differences between the magnetomotive forces of the coil bodies Ua, Va, Wa and the magnetomotive forces of the coil bodies Ub, Vb, Wb, and (b) the respective phase differences between the magnetomotive forces between the coil bodies Ub, Vb, Wb and the magnetomotive forces of the coil bodies Uc, Vc, Wc within a predetermined phase range, the electrical sixth-order or twelfth-order harmonic components are canceled thereby enabling suppression of the torque ripple.

First Embodiment

Hereafter, each of the embodiments is described with reference to the drawings. In the following embodiments, same or equivalent parts are denoted by the same reference numbers in the drawings, and the description of the same reference numbers is borrowed from the first one. In the first embodiment, a motor 10 as a rotating electrical machine is described as an example.

The motor 10 shown in FIG. 1 is of a permanent magnet field type, and is, more specifically, a permanent magnet field type synchronous machine having a three-phase winding. That is, the motor 10 is a brushless motor. This three-phase winding may have two systems, i.e., two sets of winding wires. The motor 10 includes a housing 20, a stator 30 fixed to the housing 20, a rotor 40 that rotates with respect to the stator 30, and a rotating shaft 11 to which the rotor 40 is fixed. Hereafter, in the present embodiment, an axial direction indicates a direction of axis of the rotating shaft 11 (i.e., direction of an arrow Y1 in FIG. 1 etc.). The radial direction indicates a direction of a radius of the rotating shaft 11/the motor 10 (i.e., direction of an arrow Y2 in FIG. 1 etc.). The circumferential direction indicates a direction of circumference of the rotating shaft 11 (i.e., direction of an arrow Y3 in FIG. 2 etc.).

The housing 20 is formed in a cylindrical shape, and the stator 30 and the rotor 40 are accommodated in the housing 20. Bearings 23 and 24 are provided in the housing 20, and the rotating shaft 11 is rotatably supported by the bearings 23 and 24. A center axis of an inner peripheral surface of the housing 20 is coaxial with the rotating shaft 11. An angle sensor 12 is disposed on a tip end of the rotating shaft 11. The angle sensor 12 may be a magnetic sensor or a resolver.

The stator 30 is provided in a cylindrical shape along the inner periphery of the housing 20 at an approximate center (i.e., on a middle part) in the axial direction of the housing 20. The stator 30 is fixed to the inner peripheral surface of the housing 20 around an axis O of the rotating shaft 11. The stator 30 constitutes a part of a magnetic circuit, has a ring shape, and includes a stator iron core 31 (i.e., may also be referred to as an armature core, or as a stator core) disposed in a radially opposed manner on an outer periphery of the rotor 40, and a stator winding 32 (i.e., may also be referred to as an armature winding, or as an armature coil) wound around the stator core 31. The winding may also be described as "wound on" the core or the teeth, hereafter.

Figure 2:
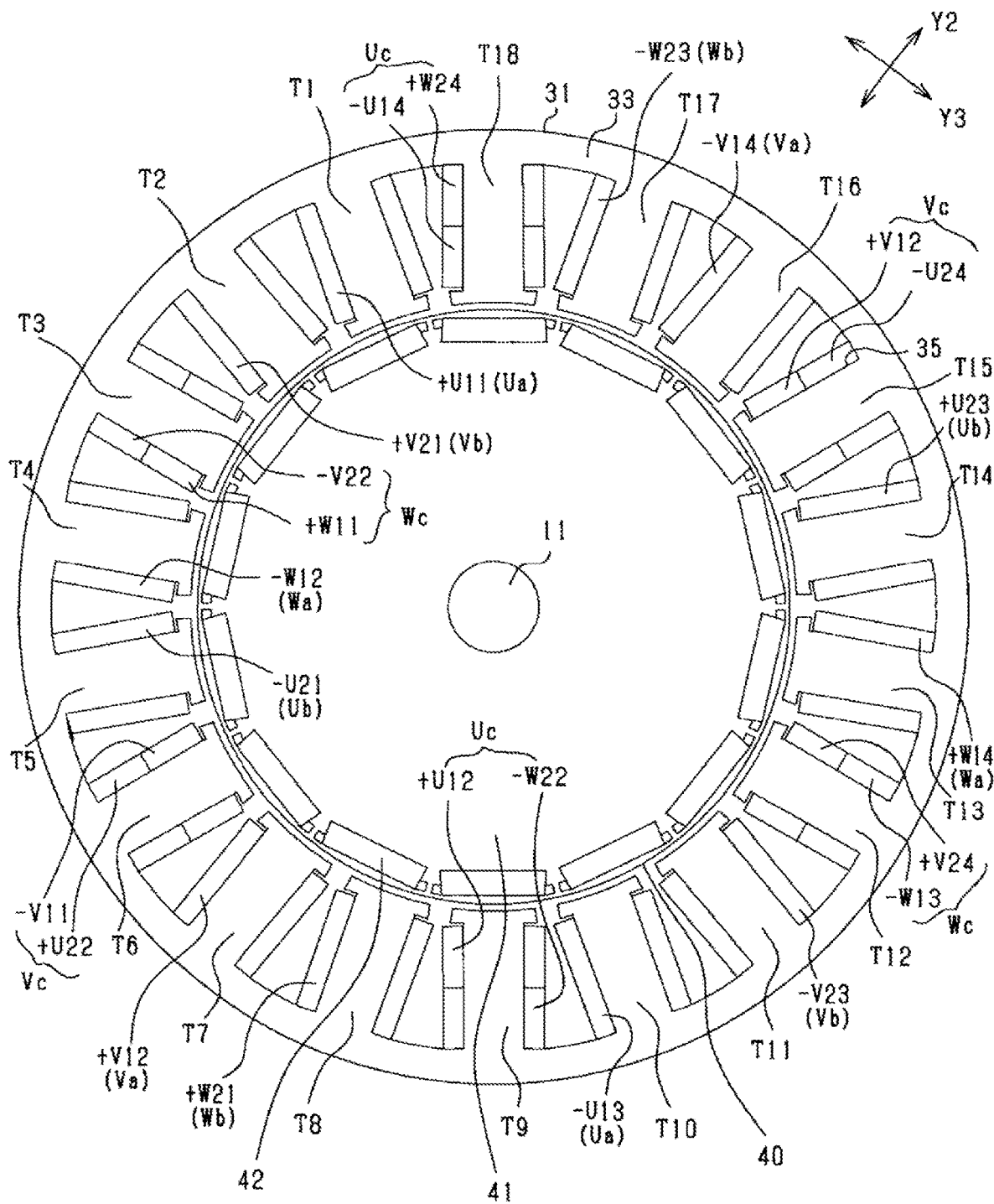
FIG. 2 is a latitudinal cross-sectional view of the motor.

As shown in FIG. 2, the stator core 31 includes an annular back yoke 33 and a plurality of teeth T1 to T18 radially protruding from the back yoke 33 toward the rotating shaft 11 along the radial direction and arranged at a predetermined distance in the circumferential direction, every two of which are interposed with a slot 35 (i.e., a stator slot) formed therebetween. In the stator core 31, the slots 35 are provided at equal intervals in the circumferential direction, and the stator winding 32 is wound around or on the slots 35. In the present embodiment, the number of teeth T1 to T18 is "18," and the number of the slots 35 is "18." For the convenience of description, the teeth T1 to T18 are marked by the symbols T1 to T18 in a counterclockwise order along the circumferential direction. The stator winding 32 is accommodated and held in the slot 35. The stator winding 32 generates magnetic flux when electric power (i.e., an alternating current (AC) electric power) is supplied thereto.

The stator core 31 is an integral type formed by laminating steel plates (i.e., core sheets) which are a plurality of thin plate-like magnetic bodies forming an annular shape stuck along the axial direction of the stator core 31. The steel plate is formed by press-punching a material such as a strip-shaped electromagnetic steel plate.

The rotor 40 constitutes a part of a magnetic circuit, has one or more pairs of magnetic poles arranged in the circumferential direction, and is disposed so as to face the stator 30 in the radial direction. In the present embodiment, the rotor 40 has 14 magnetic poles (that is, the number of magnetic pole pairs is 7). The rotor 40 includes a rotor core 41 made of a magnetic material and a permanent magnet 42 fixed onto the rotor core 41. More specifically, as shown in FIG. 2, the rotor 40 includes 14 permanent magnets 42 as magnet units so that their polarities are alternately arranged in the circumferential direction, and the permanent magnet 42 is embedded in an accommodation hole provided in the rotor core 41 along the axial direction.

The rotor 40 may have a known configuration, and may be, for example, an IPM (i.e., abbreviation of "Interior Permanent Magnet") rotor or may also be an SPM (i.e., abbreviation of "Surface Permanent Magnet") rotor. Further, the rotor 40 may also be a rotor provided on the field winding side. In the present embodiment, an IPM type rotor is adopted. The rotor 40 has the rotating shaft 11 inserted thereinto and is fixed to the rotating shaft 11 so as to rotate integrally with the rotating shaft 11 around the rotating shaft 11.

A controller 50 is connected to the motor 10. The controller 50 is mainly configured by a microcomputer including a CPU, a ROM, a RAM, an I/O, and the like, and various functions are realized by the CPU executing programs stored in the ROM. Note that the various functions may also be realized by an electronic circuit that is hardware, or may be realized at least in part by software, that is, according to processing performed by the computer.

As a function of the controller 50, for example, the function to convert the electric power supplied from the outside of the motor 10 (e.g., from a battery) and to supply the converted power to the motor 10 to generate drive power is provided. Further, for example, the controller 50 has a function of controlling the motor 10 (i.e., current control or the like) using information about a rotation angle input from the angle sensor 12.

Figure 3:
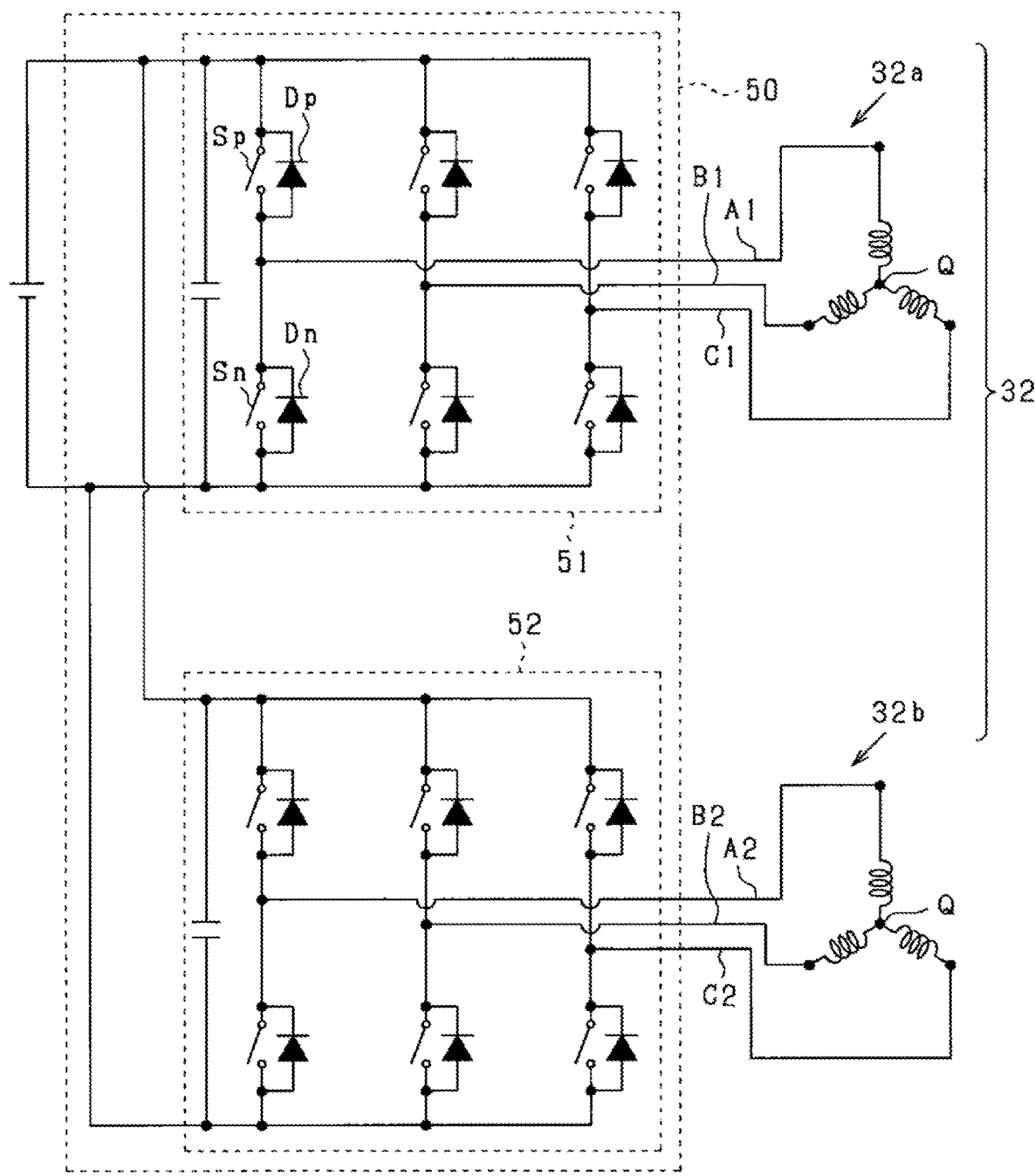
FIG. 3 is a diagram of an electrical configuration of a control device.

Further, as shown in FIG. 3, the controller 50 is provided with a first inverter circuit 51 and a second inverter circuit 52. The first inverter circuit 51 is configured by a full bridge circuit having three phases and having upper and lower arms in corresponding number of three phases. The controller 50 controls electric current in each phase by turning on and off of switching elements provided in each arm.

More specifically, as shown in FIG. 3, the first inverter circuit 51 includes a series connection body of an upper arm switch Sp and a lower arm switch Sn as switching elements in the three phases including a U phase, a V phase, and a W phase. In the present embodiment, voltage-controlled semiconductor switching elements are used as the upper arm switch Sp and the lower arm switch Sn in each phase, which are, more specifically, IGBTs. The switching elements may also be MOSFETs. Free wheel diodes (i.e., reflux diodes) Dp and Dn are connected in anti-parallel (i.e., reversely connected in parallel) with the upper arm switch Sp and the lower arm switch Sn in each phase.

A high potential side terminal (i.e., a collector) of the upper arm switch Sp of each phase is connected to a positive terminal of the battery. A low potential side terminal (i.e., an emitter) of the lower arm switch Sn of each phase is connected to a negative terminal (i.e., a ground) of the battery. An intermediate connection point between the upper arm switch Sp and the lower arm switch Sn of each phase is connected to one end of the stator winding 32 (i.e., lead wires A1, B1, C1, respectively). Since the second inverter circuit 52 has the same configuration as the first inverter circuit 51, detailed description thereof is omitted.

Generally, in rotating electrical machines, noise and vibration based on torque ripple are problematic. Since the torque ripple is mainly composed of the 6th harmonic component or the 12th harmonic component, it is desirable to suppress these components. Therefore, the configuration is devised as follows.

The stator windings 32 are classified into U-phase, V-phase, and W-phase stator windings 32 respectively representing one of the three phases. As shown in FIGS. 4 and 5, the U-phase stator winding 32 includes eight winding sections +U11, +U12, −U13, −U14, −U21, +U22, +U23, and −U24. The V-phase stator winding 32 includes eight winding sections −V11, +V12, +V13, −V14, +V21, −V22, −V23, and +V24. The U-phase stator winding 32 includes eight winding sections +W11, −W12, −W13, +W14, +W21, −W22, −W23, and +W24.

As shown in FIGS. 2 and 4, 24 winding sections correspond to the teeth T1 to T18, in an order of +U11, +V21, +W11/−V22, −W12, −U21, −V11/+U22, +V12, +W21, +U12/−W22, −U13, −V23, −W13/+V24, +W14, +U23, +V13/−U24, −V14, −W23, and −U14/+W24 (i.e., in an order from top to bottom of a table of FIG. 4).

The signs "+" and "−" indicate the direction of the electric current, that is, the polarity of the field generated by the winding section. For example, in FIG. 2 of the present embodiment, the current flowing from a front side to a back side of the drawing (i.e., a paper on which FIG. 2 is drawn) has a "+" sign, and the current flowing from the back side to the front side has a "−" sign. That is, when a current flows through the stator winding 32, the "+" winding section and the "−" winding section generate magnetomotive forces that are opposite in the radial direction. It can be understood that the "+" winding section and the "−" winding section have a phase difference of 180 degrees in electric angle regarding the magnetomotive force. The "+" winding section and the "−" winding section can be realized by reversing the winding method/direction. The same applies to a coil body described later.

Further, "/" indicates that two winding sections are arranged/wound at different radial positions on the same teeth T1 to T18. That is, two winding sections are disposed on the teeth T3, T6, T9, T12, T15, and T18. Further, one winding section is arranged/wound on the other teeth T1, T2, T4, T5, T7, T8, T10, T11, T13, T14, T16, and T17. On the teeth T3, T6, T9, T12, T15, and T18, the radial positions (i.e., an outer-away position from the shaft 11 and an inner-side position close to the shaft 11 and to a tip of the tooth) of the two winding sections on one tooth may be interchanged.

Next, the wiring of the stator winding 32 is described with reference to FIGS. 5A and 5B. In the present embodiment, Y connection (i.e., a star connection) is used. However, a delta connection may also be used.

Figure 5A:
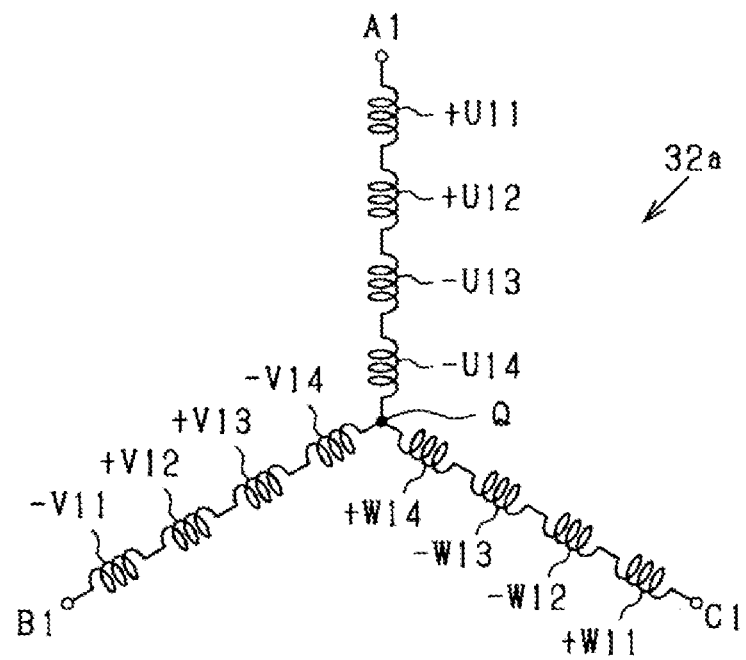
FIGS. 5A, 5B are respectively a diagram of a stator winding.
Figure 5B:
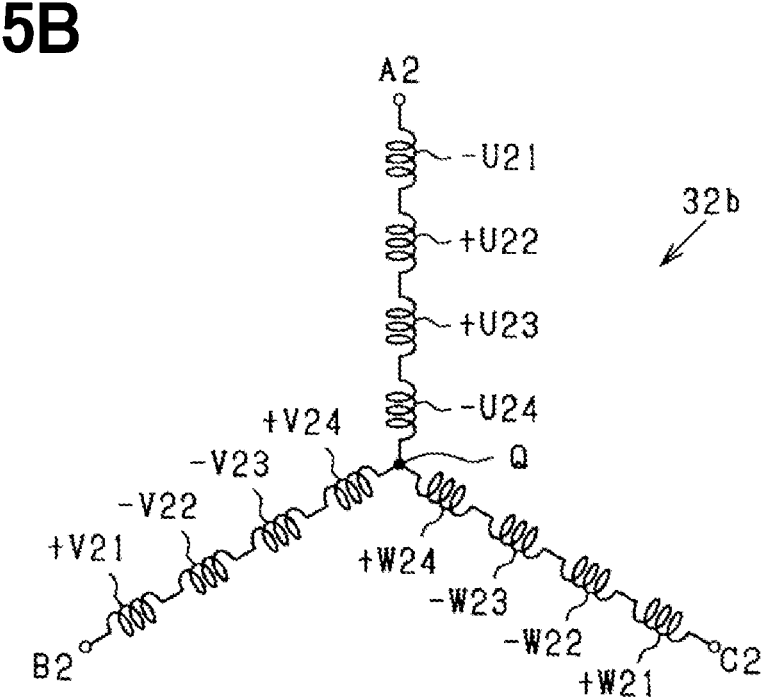

As shown in FIGS. 5A and 5B, the stator winding 32 is composed of a first stator winding 32a and a second stator winding 32b. In the first stator winding 32a, the U-phase winding sections +U11, +U12, −U13, −U14 are connected in series, and the V-phase winding sections −11, +V12, +V13, −V14 are connected in series, and the W-phase winding sections +W11, −W12, −W13, +W14 are connected in series. These series-connected bodies have one end connected to a neutral point Q and the other end connected to the lead wires A1, B1, and C1 that are connected to the first inverter circuit 51, respectively. Note that, more practically, the U-phase winding section is connected to the lead wire A1, the V-phase winding section is connected to the lead wire B1, and the W-phase winding section is connected to the lead wire C1.

Similarly, in the second stator winding 32b, the U-phase winding sections −U21, +U22, +U23, −U24 are connected in series, and the V-phase winding sections +V21, −V22, −V23, +V24 are connected in series, and the W-phase winding sections +W21, −W22, −W23, +W24 are connected in series. These series-connected bodies have one end connected to the neutral point Q and the other end connected to lead wires A2, B2, and C2 that are connected to the second inverter circuit 52, respectively. Note that, more practically, the U-phase winding section is connected to the lead wire A2, the V-phase winding section is connected to the lead wire B2, and the W-phase winding section is connected to the lead wire C2.

Figure 6:
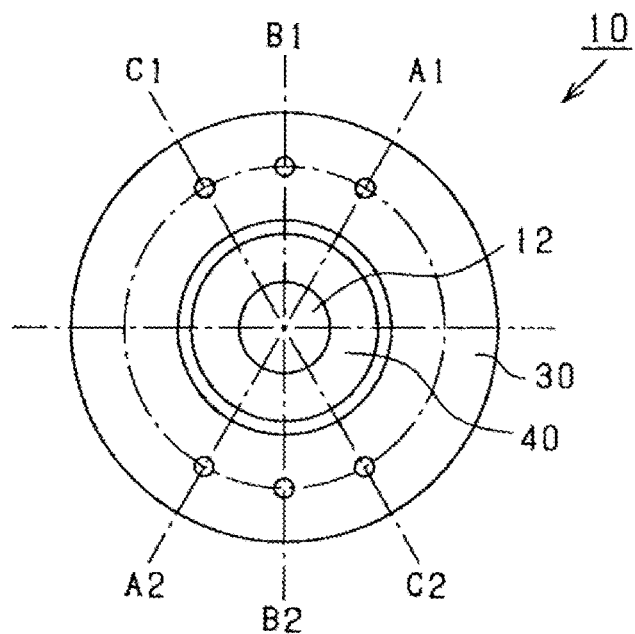
FIG. 6 is a diagram of an arrangement of lead wires.

As shown in FIG. 6, the lead wires A1, B1, C1, A2, B2, and C2 are arranged so as to be point symmetric about the axis O of the rotating shaft 11. That is, the lead wires A1 and A2 are arranged at an interval of 180 degrees, the lead wires B1 and B2 are arranged at an interval of 180 degrees, and the lead wires C1 and C2 are arranged at an interval of 180 degrees. The lead wires A1, B1, C1, A2, B2, and C2 are respectively provided as a straight line along the axial direction.

Here, by winding only the first stator winding 32a on the teeth T1, T4, T7, T10, T13, and T16, those teeth respectively have two coil bodies in each (i.e., the same) phase disposed thereon. Thus, U-phase coil bodies are respectively marked as a coil body Ua, V-phase coil bodies are respectively marked as a coil body Va, and W-phase coil bodies are respectively marked as a coil body Wa. Hereafter, a tooth on which only the first stator winding 32a is wound may be referred to as a first tooth. In the first embodiment, the teeth T1, T4, T7, T10, T13, and T16 respectively correspond to the first tooth.

Further, by winding only the first stator winding 32a on the teeth T2, T5, T8, T11, T14, and T17, those teeth respectively have two coil bodies in each (i.e., the same) phase disposed thereon. Thus, U-phase coil bodies are respectively marked as a coil body Ub, V-phase coil bodies are respectively marked as a coil body Vb, and W-phase coil bodies are respectively marked as a coil body Wb. Hereafter, a tooth on which only the second stator winding 32b is wound may be referred to as a second tooth. In the first embodiment, the teeth T2, T5, T8, T11, T14, and T17 respectively correspond to the second tooth.

Then, the first stator winding 32a and the second stator winding 32b are respectively wound on each of the teeth T3, T6, T9, T12, T15, and T18, thereby two coil bodies of respective phases are disposed on those teeth. That is, the U-phase coil bodies are respectively marked as a coil body Uc, the V-phase coil bodies are respectively marked as a coil body Vc, and the W-phase coil bodies are respectively marked as a coil body Wc. Hereafter, a tooth on which the first stator winding 32a and the second stator winding 32b are respectively wound may be referred to as a third tooth. In the first embodiment, the teeth T3, T6, T9, T12, T15, and T18 respectively correspond to the third tooth.

As shown in FIG. 2, the coil bodies Ua, Va, Wa, Ub, Vb, Wb, Uc, Vc, and Wc of respective phases are arranged in two-time rotation symmetry about the axis of the rotating shaft 11. That is, even when a mechanical angle is rotated by 180 degrees about the axis, the arrangement order of the coil bodies Ua, Va, Wa, Ub, Vb, Wb, Uc, Vc, Wc is the same.

Here, a magnetomotive force $Fu1a$ of the winding sections +U11 and +U12, a magnetomotive force $Fu1b$ of the winding sections −U13 and −U14, a magnetomotive force $Fu2a$ of the winding sections +U22 and +U23, and a magnetomotive force $Fu2b$ of the winding sections −U21 and −U24 are respectively represented by equations (1) to (4). Note that "$\theta$" is a phase of the electric current flowing through the stator winding 32 (i.e., with reference to the U-phase current supplied from the first inverter circuit 51). Also, "$\beta$" is a phase difference between the electric current supplied from the first inverter circuit 51 and the electric current supplied from the second inverter circuit 52 (i.e., may hereafter be referred to as a current phase difference). Also, "N" is the number of turns of each of the winding sections.

$$Fu1a = NI \sin(\theta) \quad (1)$$

$$Fu1b = NI \sin(\theta - 180) \quad (2)$$

$$Fu2a = NI \sin(\theta - \beta) \quad (3)$$

$$Fu2b = NI \sin(\theta - 180 - \beta) \quad (4)$$

Similarly, a magnetomotive force $Fv1a$ of the winding sections +V12 and +V13, a magnetomotive force $Fv1b$ of the winding sections −V11 and −V14, a magnetomotive force $Fv2a$ of the winding sections +V21 and +V24, and a magnetomotive force $Fv2b$ of the winding sections −V22 and −V23 are respectively represented by equations (5) to (8).

$$Fv1a = NI \sin(\theta - 120) \quad (5)$$

$$Fv1b = NI \sin(\theta - 300) \quad (6)$$

$$Fv2a = NI \sin(\theta - 120 - \beta) \quad (7)$$

$$Fv2b = NI \sin(\theta - 300 - \beta) \quad (8)$$

Similarly, a magnetomotive force $Fw1a$ of winding sections +W11 and +W14, a magnetomotive force $Fw1b$ of winding sections −W12 and −W13, a magnetomotive force $Fw2a$ of winding sections +W21 and +W24, and a magnetomotive force $Fw2b$ of winding sections −W22 and −W23 are respectively represented by equations (9) to (12).

$$Fw1a = NI \sin(\theta - 240) \quad (9)$$

$$Fw1b = NI \sin(\theta - 420) = N \sin(\theta - 60) \quad (10)$$

$$Fw2a = NI \sin(\theta - 240 - \beta) \quad (11)$$

$$Fw2b = NI \sin(\theta - 420 - \beta) = NI \sin(\theta - 60 - \beta) \quad (12)$$

Then, a sixth harmonic component "Tr6" of a torque in each phase is represented by an equation (13). Further, a twelfth harmonic component "Tr12" of a torque in each phase is represented by an equation (14).

$$Tr6 = Ta \sin 6(\theta + \alpha) + Tb \sin 6(\theta + \alpha - \lambda 1) + Tc \sin 6(\theta + \alpha - \lambda 2) \quad (13)$$

$$Tr12 = Ta \sin 12(\theta + \alpha) + Tb \sin 12(\theta + \alpha - \lambda 1) + Tc \sin 12(\theta + \alpha - \lambda 2) \quad (14)$$

Note that, in the equations (13) and (14), "$\alpha$" is a constant which depends on noise and the like. Further, in the first embodiment, the first term of the equations (13) and (14) corresponds to a component based on the coil bodies Ua, Va, and Wa, and the second term thereof corresponds to a component based on the coil bodies Ub, Vb, and Wb, and the third term thereof corresponds to a component based on the coil bodies Uc, Vc, and Wc.

In addition, "$\lambda 1$" indicates a phase difference of the magnetomotive force of the coil body Ub with respect to the magnetomotive force of the coil body Ua in the U phase. That is, "$\lambda 1$" is a phase delay of the magnetomotive force of the coil body Ub with respect to the magnetomotive force of the coil body Ua. Similarly, "$\lambda 1$" indicates a phase difference of the magnetomotive force of the coil body Vb with respect to the magnetomotive force of the coil body Va in the V phase, and indicates a phase difference of the magnetomotive force of the coil body Wb with respect to the magnetomotive force of the coil body Wa in the W phase. Similarly, "$\lambda 2$" indicates a phase difference of the magnetomotive force of the coil body Uc with respect to the magnetomotive force of the coil body Ua in the U phase, and indicates a phase difference of the magnetomotive force of the coil body Vc with respect to the magnetomotive force of the coil body Va in the V phase, and indicates a phase difference of the magnetomotive force of the coil body Wc with respect to the magnetomotive force of the coil body Wa in the W phase. Further, in the equations (13) and (14), "Ta" is a constant proportional to the number of turns and the amplitude of the electric current of the coil bodies Ua, Va and Wa. Also, "Tb" is a constant proportional to the number of turns and the amplitude of the electric current of the coil bodies Ub, Vb and Wb. Also, "Tc" is a constant proportional to the number of turns and the amplitude of the electric current of the coil bodies Uc, Vc and Wc.

Figure 7A:
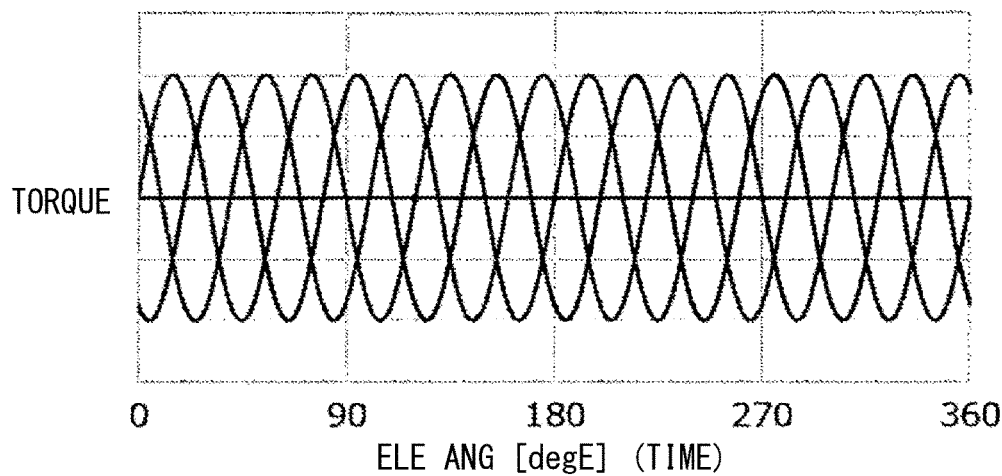
FIGS. 7A, 7B are respectively a diagram of harmonic components of a torque.
Figure 7B:
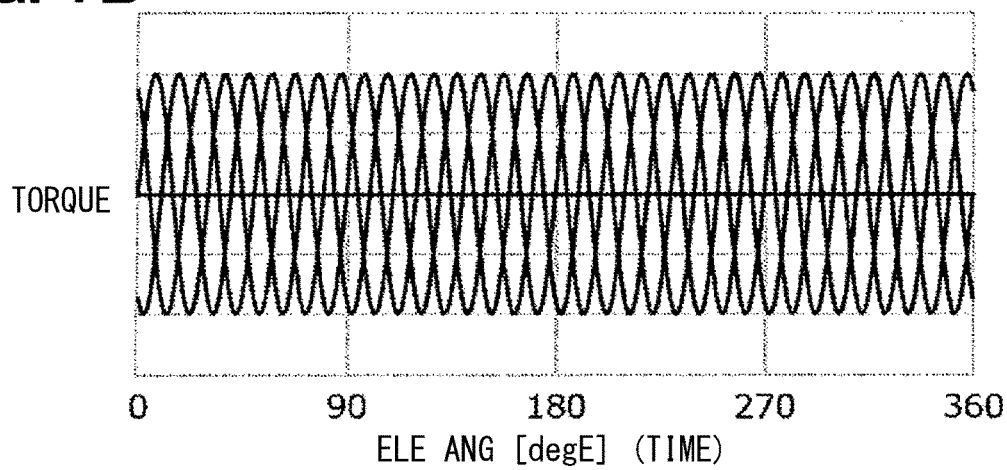

Here, when "$\lambda 1$" and "$\lambda 2$" represent electric angles "20 degrees" and "40 degrees" respectively and "Ta," "Tb," and "Tc" are the same, each of the harmonic components of the torque is canceled, as seen in equations (15), (16) and FIGS. 7A and 7B.

$$Tr6 = Ta \sin 6(\theta+\alpha) + Tb \sin 6(\theta+\alpha-20) + Tc \sin 6(\theta+\alpha-40) = Ta \sin 6(\theta+\alpha) + Ta \sin\{6(\theta+\alpha)-120\} + Ta \sin\{6(\theta+\alpha)-240\} = 0 \quad (15)$$

$$Tr12 = Ta \sin 12(\theta+\alpha) + Tb \sin 12(\theta+\alpha-20) + Tc \sin 12(\theta+\alpha-40) = Ta \sin 12(\theta+\alpha) + Ta \sin\{12(\theta+\alpha)-120\} + Ta \sin\{12(\theta+\alpha)-240\} = 0 \quad (16)$$

Then, in the present embodiment, the current phase difference "β" between the first inverter circuit 51 and the second inverter circuit 52 is 20 degrees in electric angle. That is, each of the phase differences of the magnetomotive forces of the coil bodies Ub, Vb, Wb with respect to the magnetomotive forces of the coil bodies Ua, Va, Wa is 20 degrees, and "λ1" is thus 20 degrees. Therefore, if each of the phase differences of the magnetomotive forces of the coil bodies Uc, Vc, Wc with respect to the magnetomotive forces of the coil bodies Ua, Va, Wa is controlled to be 40 degrees, it enables suppression of the torque ripple.

That is, the (respective) phase differences between the magnetomotive forces of the coil bodies Ub, Vb, Wb with respect to the magnetomotive forces of the coil bodies Ua, Va, Wa, and the (respective) phase differences between the magnetomotive forces of the coil bodies Uc, Vc, Wc with respect to the magnetomotive forces of the coil bodies Ub, Vb, Wb may be set to 20 degrees, respectively, for the intended effects. Note that, even though the phase difference may preferably be set to 20 degrees, a predetermined phase range including 20 degrees (e.g., a range from 15 to 25 degrees) also enables suppression effects of the torque ripple.

Therefore, in the present embodiment, for enabling that the phase differences of the magnetomotive forces of the coil bodies Uc, Vc, Wc with respect to the magnetomotive forces of the coil bodies Ua, Va, Wa are controlled to be 40 degrees (i.e., for enabling that the phase differences of the magnetomotive forces of the coil bodies Uc, Vc, Wc with respect to the magnetomotive forces of the coil bodies Ub, Vb, Wb are controlled to be 20 degrees), the phase difference between the magnetomotive force generated by the winding section of the first stator windings 32a wound on the third teeth and the magnetomotive force generated by the winding section of the second stator winding 32b is set to be in a range of 72 to 88 degrees in electric angle. In the following, the phase differences of the magnetomotive force of the winding section of the second stator winding 32b wound on each of the third teeth with respect to the winding section of the first stator winding 32a wound on each of the same third teeth may be summed as a total phase difference.

The total phase difference in the range of 72 to 88 degrees in electric angle may preferably be set to 80 degrees. In the present embodiment, the total phase difference is set to 80 degrees.

Figure 8:
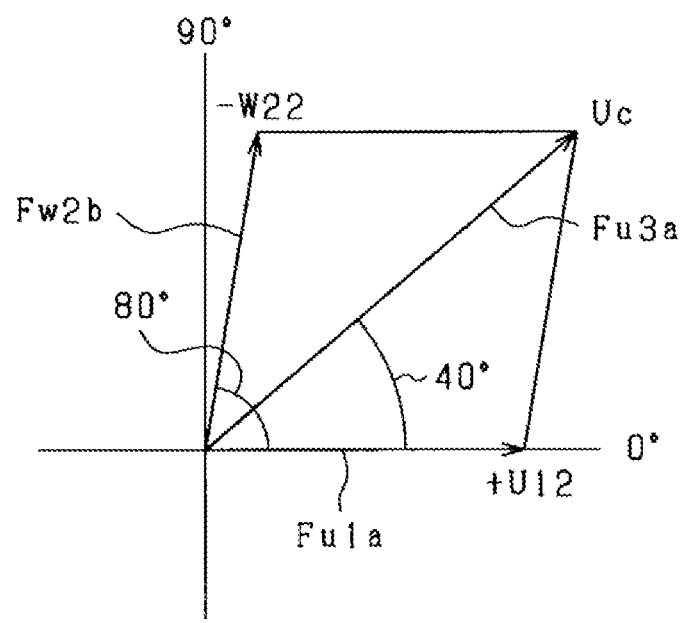
FIG. 8 is a vector diagram of a sum of magnetomotive forces.

The sum of magnetomotive forces is described in detail by exemplifying the coil body Uc provided on the tooth T9 which is a third tooth. As shown in FIGS. 2 and 4, the coil body Uc provided on the tooth T9 is configured by the winding sections +U12/−W22. The magnetomotive force Fu1a of the winding section +U12 and the magnetomotive force Fw2b of the winding section −W22 are shown in the equations (1) and (12). These magnetomotive forces are represented by a vector diagram in FIG. 8. Further, when the magnetomotive force Fu1a of the winding section +U12 and the magnetomotive force Fw2b of the winding section −W22 are added, the following equation (17) is obtained.

$$Fu3a = Fu1a + Fw2b = NI \sin(\theta) + NI \sin(\theta-80) = 1.53\, NI \sin(\theta-40) \quad (17)$$

In the equation (17), the number of turns of the winding section +U12 and the number of turns of the winding section −W22 are both N. As shown in the equation (17), by winding the winding section +U12 and the winding section −W22 on the same tooth T9, the magnetomotive forces of the coil bodies Uc, Vc, Wc are respectively realized, which have the phase differences of 40 degrees with respect to the magnetomotive forces of the bodies Ua, Va, Wa.

In the mean time, as shown in the equation (17), the magnetomotive force is proportional to the number of turns of the winding section. Therefore, the amplitude of the magnetomotive force is not uniform among the coil bodies Ua, Va, Wa, Ub, Vb, Wb, Uc, Vc, Wc, unless the number of turns of each of the winding sections is set appropriately. That is, in the equations (13) and (14), the constants "Ta," "Tb," and "Tc" vary. If the magnetomotive force amplitudes are not uniform, the torque ripple canceling effect is reduced. Therefore, it may be preferable to set the number of turns of the winding sections so that the amplitude of the magnetomotive force of each of the coil bodies Ua, Va, Wa, Ub, Vb, Wb, Uc, Vc, Wc is controlled to be within a predetermined amplitude range.

Therefore, in the present embodiment, in order to match the magnetomotive forces of the coil bodies Ua, Va, Wa with the magnetomotive forces of the coil bodies Ub, Vb, Wb, the coil bodies Ua, Va, Wa and the coil bodies Ub, Vb, Wb have the same number of turns, i.e., the number of turns is set to the same number "Na."

Further, the number of turns of the first stator winding 32a wound on each third tooth and the number of turns of the number of turns of the second stator winding 32a are respectively set so that the magnetomotive forces of the coil bodies Ua, Va, Wa, Ub, Vb, Wb, Uc, Vc, Wc in respective phases substantially have the same magnitude.

More specifically, when the number of turns of the first stator winding 32a wound on the third tooth and the number of turns of the second stator winding 32b wound on the same third tooth are "Nb," the numbers "Na" and "Nb" are set so as to satisfy a relationship 1.4≤Na/Nb≤1.6. It may be preferable that Na/Nb has a value that approaches 1.53, whereby, in the present embodiment, the number of turns is set so that Na:Nb has a ratio of 3:2 (i.e., Na/Nb=1.5).

As described above, the configuration according to the first embodiment achieves the following effects.

The phase differences of the magnetomotive forces of the coil bodies Ub, Vb, Wb with respect to the magnetomotive forces of the coil bodies Ua, Va, Wa, and the phase differences of the magnetomotive forces of the coil bodies Uc, Vc, Wc with respect to magnetomotive forces of coil bodies Ub, Vb, Wb are controlled to be in a predetermined phase range including 20 degrees. More specifically, the phase difference (total phase difference) of magnetomotive force generated by the winding section of the second stator winding 32b wound on each of the third teeth with respect to the magnetomotive force generated by the winding section of the first stator winding 32a wound on each of the third teeth 32b is set to be in the range of 72 to 88 degrees in electric angle. In the present embodiment, the total phase difference is set to 80 degrees. As a result, as shown in the equations (15) to (17), it is possible to cancel the 6th or 12th harmonic component of the torque and to suppress the torque ripple.

The number of turns of each of the winding sections is set so that the magnetomotive force of each of the coil bodies Ua, Va, Wa, Ub, Vb, Wb, Uc, Vc, Wc is controlled to be within a predetermined amplitude range (i.e., to have the same level/magnitude in the present embodiment). More specifically, when the number of turns of the first stator winding 32a wound on the first teeth is "Na," the second stator winding 32b wound on the second teeth has the number of turns set to the same number "Na." Further, when the number of turns of the first stator winding 32a wound on the third teeth and the number of turns of the second stator winding 32b wound on the same third teeth are respectively set to "Nb," the numbers Na and Nb are set to satisfy the relationship of 1.4≤Na/Nb≤1.6. In the present embodiment, the numbers Na and Nb are set so that Na:Nb has the ratio of 3:2 (i.e., Na/Nb=1.5). In such manner, the amplitude of the magnetomotive force of each of the coil body Ua, Va, Wa, Ub, Vb, Wb, Uc, Vc, and Wc is made substantially uniform, and the torque ripple is suppressible.

In the motor 10, the number of magnetic poles is "14," and the number of the slots 35 is "18." That is, the number of magnetic poles is (18±4)×m ('m' is an integer of 1 or more), and the number of slots is 18×m. In such manner, the electromagnetic force can be balanced about the center axis of the motor 10.

Figure 9A:
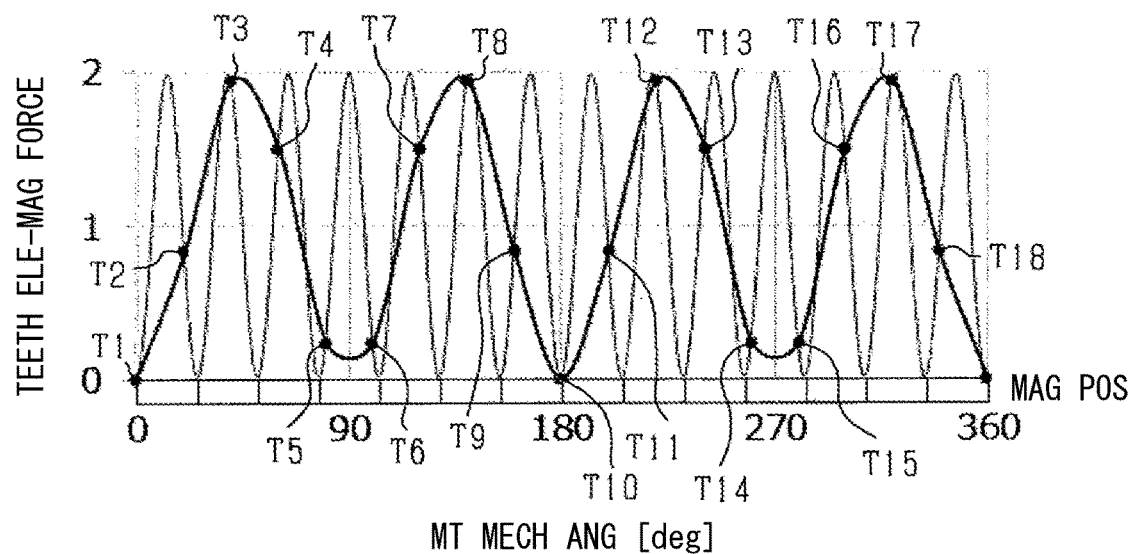
FIGS. 9A, 9B are respectively a diagram of fluctuations in electromagnetic force.
Figure 9B:
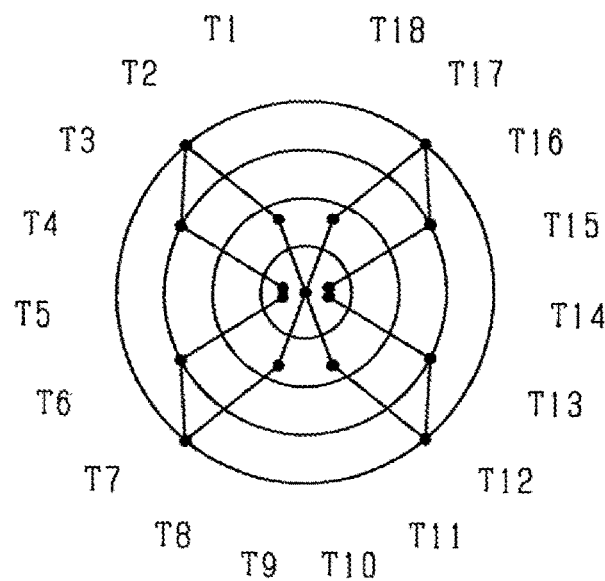

The balance of the force is described in detail with reference to FIGS. 9A and 9B. FIG. 9A is a diagram showing a relationship between the electromagnetic forces respectively generated by the teeth T1 to T18 and the mechanical angle of the motor 10. FIG. 9B shows a fluctuation of the electromagnetic forces shown in FIG. 9A along the circumferential direction when the rotating shaft 11 is assumed as a center of the diagram.

As shown in FIG. 4, the U-phase coil bodies Ua, Ub, Uc are arranged at intervals of about 90 degrees. The same applies to the V-phase coil bodies Va, Vb, Vc and the W-phase coil bodies Wa, Wb, Wc. Therefore, as shown in FIG. 9B, the balance of electromagnetic forces is well-maintained. Therefore, the electromagnetic force is not biased toward any one direction, thereby torque fluctuation can be suppressed, and vibration and noise can be suppressed.

The number of magnetic poles is "14," and the number of slots is "18," and the total phase difference of the magnetomotive forces generated by the winding section of the first stator winding 32a wound on the third teeth with respect to the magnetomotive forces generated by the winding section of the second stator winding 32b wound on the same third teeth is set to 80 degrees in electric angle. In such manner, the winding sections are arrange/positioned in a manner shown in FIG. 2 and FIG. 4. Therefore, as seen, or readily understood, from FIGS. 2 and 4, the first stator winding 32a wound on one third tooth is connectable to the first stator winding 32a wound on one of two circumferentially adjacent teeth T1 to T18. For example, the winding section −U14 of the first stator winding 32a wound on the tooth T18 which is a third tooth is connectible/connectable to the winding section +U11 of the stator winding 32a wound on the tooth T1 which is a first tooth adjacent to the tooth T18 in the circumferential direction.

Similarly, the second stator winding 32b wound on a third tooth is connectible to the second stator winding 32b wound on the adjacent one of the teeth T1 to T18 adjacent in the circumferential direction. For example, the winding section +W24 of the second stator winding 32b wound on the tooth T18 which is a third tooth is connectible to the winding section −W23 of the child winding 32b wound on the tooth T17 which is a second tooth adjacent to the tooth T18 in the circumferential direction. In such manner, a bridge wire for establishing a connection between the two slots 35 at the coil ends can be shortened, thereby connection therebetween is made easy and is reducible in size.

As shown in FIG. 6, the lead wires A1, B1, C1, A2, B2, and C2 are arranged in symmetry about the center axis of the rotating shaft 11 in terms of respective phases. In such manner, leakage magnetic fluxes generated by the lead wire A1, B1, C1, A2, B2, C2 can be balanced and canceled with each other, thereby enabling suppression of a detection error in a detection angle of the angle sensor 12.

Second Embodiment

In the first embodiment, the total phase difference is 80 degrees. In the second embodiment, the total phase difference is set to 40 degrees. That is, in the second embodiment, for having 40 degrees as each phase difference of the magnetomotive force of each of the coil bodies Uc, Vc, Wc with respect to the magnetomotive force of each of the coil bodies Ua, Va, Wa, the total phase difference of the magnetomotive force generated by the winding section of the second stator winding 32b wound on each of the third teeth with respect to the magnetomotive force generated by the winding section of the first stator winding 32a wound on each of the third teeth is set to 40 degrees. Note that, though the angle may preferably be set to 40 degrees, the angle may be set to a value within a range of 32 to 48 degrees.

Figure 11:
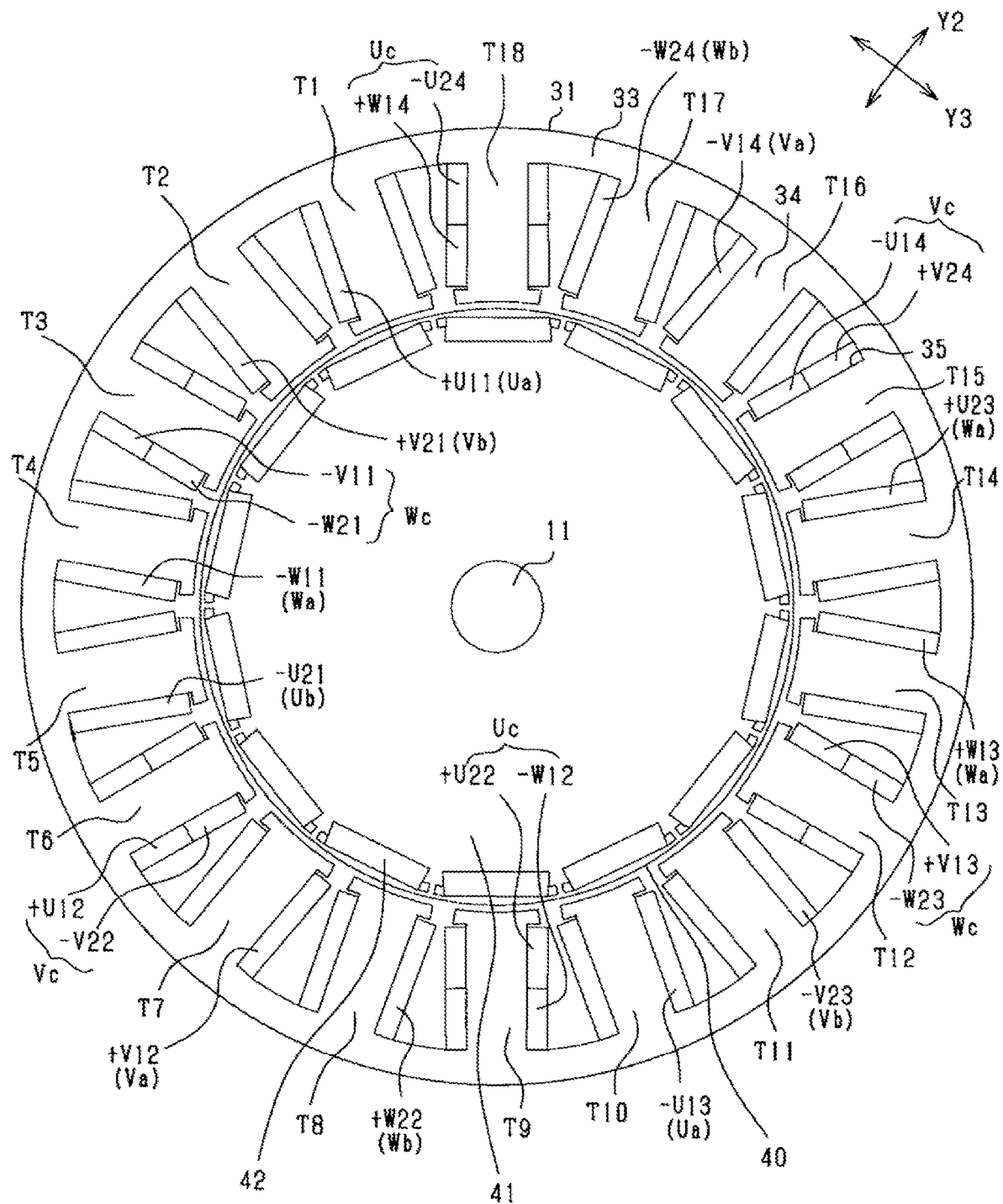
FIG. 11 is a latitudinal cross-sectional view of the motor.

In such case, the arrangement of the winding sections in each phase is configured as shown in FIGS. 10 and 11. Here, the coil body Uc provided on the tooth T9 is exemplified to explain that the total phase difference is 40 degrees.

Figure 12:
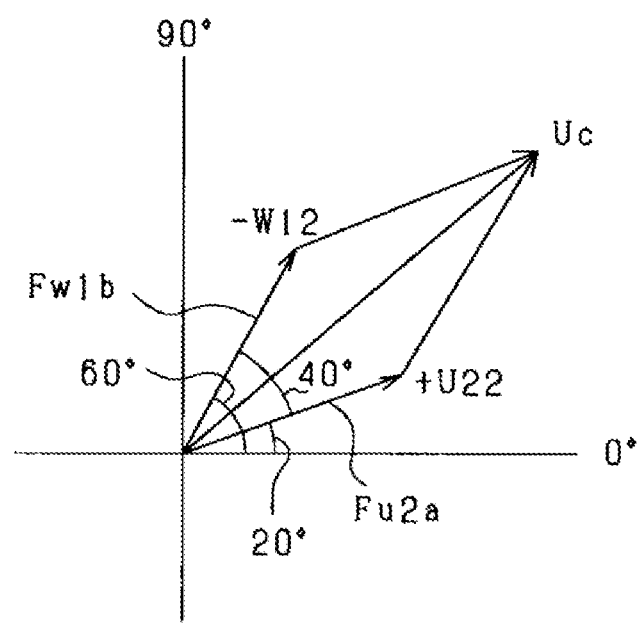
FIG. 12 is a vector diagram of a sum of magnetomotive forces according to the second embodiment.

As shown in FIG. 10, the coil body Uc provided on the tooth T9 is constituted by winding sections −W12/+U22. The magnetomotive force Fw1b of the winding section −W12 and the magnetomotive force Fu2a of the winding section +U22 are respectively shown in the equations (10) and (3). These forces are depicted in a vector diagram as shown in FIG. 12. Then, a total force of the magnetomotive force Fw1b of the winding section −W12 and the magnetomotive force Fu2a of the winding section +U22 is shown in the following equation (18).

$$Fu3a = Fw1b + Fu2a = NI\sin(\theta-60) + NI\sin(\theta-20) = 1.88\ NI\sin(\theta-40) \quad (18)$$

In the equation (18), the number of turns of the winding section −W12 and the number of turns of the winding section +U22 are both N. As shown in the equation (18), by winding the winding section −W12 and the winding section +U22 on the tooth T9, a phase difference (i.e., the total phase difference) of the magnetomotive forces of the coil bodies Uc, Vc, Wc with respect to the magnetomotive forces of the coil bodies Ua, Va, Wa is obtained/realized as 40 degrees.

In the mean time, as shown in the equation (18), the magnetomotive force is proportional to the number of turns of the winding section. Therefore, the amplitude of the magnetomotive force is not uniform among the coil bodies Ua, Va, Wa, Ub, Vb, Wb, Uc, Vc, Wc, unless the number of turns of each of the winding sections is set appropriately.

Therefore, in the second embodiment, when (a) the coil body Ua, Va, Wa and the coil bodies Ub, Vb, Wb are all set to the same winding number "Na" and (b) the number of turns of the first stator winding 32a wound on the third tooth and the number of turns of the second stator winding 32b wound on the third teeth are set to "Nb," the number of turns "Na" and the number of turns "Nb" are set so as to satisfy a relationship of 1.8≤Na/Nb≤2.0. It may be preferable that Na/Nb has a value that approaches 1.88, which is, in the present embodiment, set as a ratio of 19:10 for Na:Nb (i.e., Na/Nb=1.9).

As mentioned above, according to the configuration of second embodiment, the following effects are achievable.

The phase differences of the magnetomotive forces of the coil bodies Ub, Vb, Wb with respect to the magnetomotive forces of the coil bodies Ua, Va, Wa, and the phase differences of the magnetomotive forces of the coil bodies Uc, Vc, Wc with respect to magnetomotive forces of coil bodies Ub, Vb, Wb are controlled to be in a predetermined phase range including 20 degrees. More specifically, the total phase difference of the magnetomotive forces generated by the winding sections of the second stator winding 32b wound on the third teeth with respect to the magnetomotive forces generated by the winding sections of the first stator winding 32a wound on the third teeth is set to 40 degrees. That is, the total phase difference is set to 40 degrees. In such manner, as shown in the equations (15), (16), and (18), cancellation of the sixth or twelfth harmonic component of the torque and suppression of the torque ripple are both achievable.

Further, the number of turns is set so as to satisfy the relationship of 1.8≤Na/Nb≤2.0. In the present embodiment, the number of turns is set so that the ratio of Na/Nb is 19:10 (Na/Nb=1.9). In such manner, the amplitude of the magnetomotive force of each of the coil body Ua, Va, Wa, Ub, Vb, Wb, Uc, Vc, and Wc is made substantially uniform, and the torque ripple is suppressible.

In the motor 10, the number of magnetic poles is "14," and the number of slots 35 is "18." That is, the number of magnetic poles is (18±4)×m (i.e., m is an integer of 1 or more), and the number of slots is 18×m. In such manner, similar to the first embodiment, an electromagnetic force can be balanced about the center axis of the motor 10.

Third Embodiment

In the first embodiment, the current phase difference "β" between the first inverter circuit 51 and the second inverter circuit 52 is 20 degrees in electric angle. In the third embodiment, it is set to 40 degrees. That is, each phase difference of the magnetomotive force of each of the coil bodies Ub, Vb, Wb with respect to the magnetomotive force of each of the coil bodies Ua, Va, Wa is 40 degrees.

Therefore, in the third embodiment, in the equations (13) and (14), the first term corresponds to a component based on the coil bodies Ua, Va, Wa, and the second term corresponds to a component based on the coil bodies Uc, Vc, Wc, and the third term corresponds to a component based on the coil bodies Ub, Vb, Wb.

Further, in the third embodiment, "λ1" indicates the phase difference of the magnetomotive force of the coil body Uc with respect to the magnetomotive force of the coil body Ua in the U phase, and also indicates the phase difference of the magnetomotive force of the coil body Vc with respect to the magnetomotive force of the coil body Va in the V phase, and also indicates the phase difference of the magnetomotive force of the coil body Wc with respect to the magnetomotive force of the coil body Wa in the W phase. Similarly, "λ2" indicates the phase difference of the magnetomotive force of the coil body Ub with respect to the magnetomotive force of the coil body Ua in the U phase, and also indicates the phase difference of the magnetomotive force of the coil body Vb with respect to the magnetomotive force of the coil body Va in the V phase, and also indicates the phase difference of the magnetomotive force of the coil body Wb with respect to the magnetomotive force of the coil body Wa in the W phase. Further, in the equations (13) and (14), "Ta" is a constant proportional to the number of turns and the amplitude of the electric current of the coil bodies Ua, Va and Wa. "Tb" is a constant proportional to the number of turns and the amplitude of the electric current of the coil bodies Uc, Vc, and Wc. "Tc" is a constant proportional to the number of turns and the amplitude of the electric current of the coil bodies Ub, Vb, Wb.

Therefore, if each phase difference of the magnetomotive force of each of the coil bodies Uc, Vc, Wc with respect to the magnetomotive force of each of the coil bodies Ua, Va, Wa is configured as 20 degrees, the torque ripple is suppressible according to the equations (15), (16).

That is, each phase difference of the magnetomotive force of each of the coil bodies Uc, Vc, Wc with respect to the magnetomotive force of each of the coil bodies Ua, Va, Wa, and each phase difference of the magnetomotive force of each of the coil bodies Ub, Vb, Wb with respect to the magnetomotive force of each of the coil bodies Uc, Vc, Wc is respectively set to 20 degrees. Note that, even though the phase difference may preferably be set to 20 degrees, a predetermined phase range including 20 degrees (e.g., a range from 15 to 25 degrees) also enables suppression effects of the torque ripple.

Therefore, in the third embodiment, the phase difference between the magnetomotive force generated by the winding section of the first stator winding 32a wound on each third tooth and the magnetomotive force generated by the winding section of the second stator winding 32b wound on the same third tooth is set to be within a range of 72 to 88 degrees in electric angle. That is, the total phase difference is set to be within the range of 72 to 88 degrees in electric angle. In the third embodiment, it may also be preferable to set the total phase difference to 80 degrees as shown in the first embodiment.

More specifically, the winding sections are arranged on the teeth T1 to T18 in a manner shown in FIG. 13. By devising such configuration, each phase difference of the magnetomotive force of each of the coil bodies Uc, Vc, Wc with respect to the magnetomotive force of each of the coil bodies Ua, Va, Wa, and each phase difference of the magnetomotive force of each of the coil bodies Ub, Vb, Wb with respect to the magnetomotive force of each of the coil bodies Uc, Vc, Wc is respectively set to 20 degrees. Further, similar to the first embodiment, for the matching of the magnetomotive forces among the coil bodies Ua, Va, Wa, Ub, Vb, Wb, Uc, Vc, Wc, the number of turns is set so that Na/Nb has a ratio of 3:2 (i.e., Na/Nb=1.5).

By devising the above-described configuration, the third embodiment can achieve the same effects as those of the first embodiment.

Fourth Embodiment

In the fourth embodiment, the current phase difference "B" of the inverter circuits 51 and 52 is set to 40 degrees, and the total phase difference is set to 40 degrees, which is different from the third embodiment. That is, the phase difference between the magnetomotive force generated by the winding section of the first stator winding 32a wound on each third tooth and the magnetomotive force generated by the winding section of the second stator winding 32b wound on each third tooth is set to 40 degrees. Note that, though the phase difference may preferably be set to 40 degrees just like the second embodiment, the phase difference may also be set to be within a range of 32 to 48 degrees.

More specifically, the winding sections are arranged on the teeth T1 to T18 in a manner shown in FIG. 14. By devising such configuration, each phase difference of the magnetomotive force of each of the coil bodies Uc, Vc, Wc with respect to the magnetomotive force of each of the coil bodies Ua, Va, Wa, and each phase difference of the magnetomotive force of each of the coil bodies Ub, Vb, Wb with respect to the magnetomotive force of each of the coil bodies Uc, Vc, Wc is respectively set to 20 degrees. For the same reason as the second embodiment, the number of turns is set so that Na/Nb has a ratio of 19:10 (i.e., Na/Nb=1.9) in order to have the uniform magnetomotive forces of the coil bodies Ua, Va, Wa, Ub, Vb, Wb, Uc, Vc, and Wc.

By devising the above-described configuration, the fourth embodiment can achieve the same effects as those of the second embodiment.

OTHER EMBODIMENTS

In the above embodiments, a modified configuration, in which the number of magnetic poles is "22," the number of slots is "18," and the current phase difference "β" between the first inverter circuit 51 and the second inverter circuit 52 is "20 degrees" for having the total phase difference of "80 degrees," may also be used. An example of such arrangement of the winding sections is shown in FIG. 15.

In an example of FIG. 15, the first stator winding 32a wound on one third tooth is connectible to the first stator winding 32a wound on one of the two adjacent teeth T1 to T18 in the circumferential direction. For example, the winding section −U12 of the first stator winding 32a wound on the tooth T2, which is a third tooth in this example, is connectible to the winding section +U11 of the first stator winding 32a wound on the tooth T1, which is a first tooth adjacent to the tooth T2 in the circumferential direction.

Similarly, the second stator winding 32b wound on a third tooth is connectible to the second stator winding 32b wound on the adjacent one of the teeth T1 to T18 adjacent in the circumferential direction. For example, the winding section +W21 of the second stator winding 32b wound on the tooth T2, which is a third tooth in this example, is connectible to the winding section −W22 of the second stator winding 32b wound on the tooth T3, which is a second tooth adjacent to the tooth T2 in the circumferential direction. In such manner, a bridge wire for establishing a connection between the two slots 35 at the coil ends can be shortened, thereby connection therebetween is made easy and is reducible in size.

In the above embodiments, a modified configuration, in which the number of magnetic poles is "22," the number of slots is "18," and the current phase difference "β" between the first inverter circuit 51 and the second inverter circuit 52 is "20 degrees" for having the total phase difference of "40 degrees," may also be used. An example of such arrangement of the winding sections is shown in FIG. 15.

In the above embodiments, a modified configuration, in which the number of magnetic poles is "22," the number of slots is "18," and the current phase difference "β" between the first inverter circuit 51 and the second inverter circuit 52 is "40 degrees" for having the total phase difference of "80 degrees," may also be used. An example of such arrangement of the winding sections is shown in FIG. 15.

In the example of FIG. 15, the first stator winding 32a wound on one third tooth is connectible to the first stator winding 32a wound on the adjacent one of the teeth T1 to T18 in the circumferential direction. In this example, the winding section +V11 of the first stator winding 32a wound on the tooth T3, which is a third tooth, is connectible to the winding section −V12 of the first stator winding 32a wound on the tooth T4, which is a first tooth adjacent to the tooth T3 in the circumferential direction.

Similarly, the second stator winding 32b wound on a third tooth is connectible to the second stator winding 32b wound on the adjacent one of the teeth T1 to T18 adjacent in the circumferential direction. For example, the winding section +U22 of the second stator winding 32b wound on the tooth T3, which is the third tooth in this example, is wound on the tooth T2, which is the second tooth adjacent in the circumferential direction. It becomes possible to connect with the winding section −U21 of the second stator winding 32b. In such manner, a bridge wire for establishing a connection between the two slots 35 at the coil ends can be shortened, thereby connection therebetween is made easy and is reducible in size.

In the above embodiments, a modified configuration, in which the number of magnetic poles is "22," the number of slots is "18," and the current phase difference "β" between the first inverter circuit 51 and the second inverter circuit 52 is "40 degrees" for having the total phase difference of "40 degrees," may also be used. An example of such arrangement of the winding sections is shown in FIG. 15.

In the above embodiments, a modified configuration, in which the number of magnetic poles is "16," the number of slots is "18," and the current phase difference "β" between the first inverter circuit 51 and the second inverter circuit 52 is "20 degrees" for having the total phase difference of "80 degrees," may also be used. An example of such arrangement of the winding sections is shown in FIG. 16.

In such case, as shown in FIG. 16, the first stator winding 32a wound on a third tooth is connectible to the first stator winding 32a wound on a next-to-adjacent one of the teeth T1 to T18 in the circumferential direction. For example, the winding section +V11 of the first stator winding 32a wound on the tooth T2, which is a third tooth in this example, is connectible to the winding section +V12 of the first stator winding 32a wound on the tooth T4, which is a first tooth next to the adjacent one of the tooth T2 in the circumferential direction.

Similarly, the second stator winding 32b wound on a third tooth is connectible to the second stator winding 32b wound on the one, i.e., a next-to-adjacent one of the teeth T1 to T18 in the circumferential direction. For example, the winding section −U21 of the second stator winding 32b wound on the tooth T2, which is a third tooth in this example, is connectible to the winding section −U24 of the second stator winding 32b wound on the tooth T18, which is a second tooth that is the next-to-adjacent one of the tooth T2 in the circumferential direction. In such manner, a bridge wire for establishing a connection between the two slots 35 at the coil end can be shortened, thereby connection therebetween is made easy and is reducible in size.

In the above embodiments, a modified configuration, in which the number of magnetic poles is "16," the number of slots is "18," and the current phase difference "β" between the first inverter circuit 51 and the second inverter circuit 52 is "20 degrees" for having the total phase difference of "40 degrees," may also be used. An example of such arrangement of the winding sections is shown in FIG. 16.

In such case, as shown in FIG. 16, the first stator winding 32a wound on a third tooth is connectible to the first stator winding 32a wound on the adjacent one of the teeth T1 to T18 adjacent in the circumferential direction. For example, the winding section −U12 of the first stator winding 32a wound on the tooth T2, which is a third tooth in this example, is connectible to the winding section +U11 of the first stator winding 32a wound on the tooth T1, which is a first tooth adjacent to the tooth T2 in the circumferential direction.

Similarly, the second stator winding 32*b* wound on a third tooth is connectible to the second stator winding 32*b* wound on the adjacent one of the teeth T1 to T18 adjacent in the circumferential direction. For example, the winding section +V21 of the second stator winding 32*b* wound on the tooth T2, which is a third tooth in this example, is connectible to the winding section −V22 of the second stator winding 32*b* wound on the tooth T3, which is a second tooth adjacent in the circumferential direction. In such manner, a bridge wire for establishing a connection between the two slots 35 at the coil ends can be shortened, thereby connection therebetween is made easy and is reducible in size.

In the above embodiments, a modified configuration, in which the number of magnetic poles is "16," the number of slots is "18," and the current phase difference "β" between the first inverter circuit 51 and the second inverter circuit 52 is "40 degrees" for having the total phase difference of "80 degrees," may also be used. An example of such arrangement of the winding sections is shown in FIG. 16.

In such case, as shown in FIG. 16, the first stator winding 32*a* wound on a third tooth is connectible to the first stator winding 32*a* wound on a next-to-adjacent one of the teeth T1 to T18 in the circumferential direction. For example, the winding section +U12 of the first stator winding 32*a* wound on the tooth T3, which is a third tooth in this example, is connectible to the winding section +U11 of the first stator winding 32*a* wound on the tooth T1, which is a next-to-adjacent first tooth in the circumferential direction.

Similarly, the second stator winding 32*b* wound on a third tooth is connectible to the second stator winding 32*b* wound on a next-to-adjacent one of the teeth T1 to T18 in the circumferential direction. For example, the winding section +W21 of the second stator winding 32*b* wound on the tooth T3, which is a third tooth in this example, is connectible to the winding section +W22 of the second stator winding 32*b* wound on the tooth T5, which is a next-to-adjacent second tooth in the circumferential direction. In such manner, a bridge wire for establishing a connection between the two slots 35 at the coil ends can be shortened, thereby connection therebetween is made easy and is reducible in size.

In the above embodiments, a modified configuration, in which the number of magnetic poles is "16," the number of slots is "18," and the current phase difference "β" between the first inverter circuit 51 and the second inverter circuit 52 is "40 degrees" for having the total phase difference of "40 degrees," may also be used. An example of such arrangement of the winding sections is shown in FIG. 16.

In such case, as shown in FIG. 16, the first stator winding 32*a* wound on a third tooth is connectible to the first stator winding 32*a* wound on the adjacent one of the teeth T1 to T18 adjacent in the circumferential direction. For example, the winding section −V11 of the first stator winding 32*a* wound on the tooth T3, which is a third tooth in this example, is connectible to the winding section +V12 of the first stator winding 32*a* wound on the tooth T4, which is a first tooth adjacent in the circumferential direction.

Similarly, the second stator winding 32*b* wound on a third tooth is connectible to the second stator winding 32*b* wound on the adjacent one of the teeth T1 to T18 adjacent in the circumferential direction. For example, the winding section −V22 of the second stator winding 32*b* wound on the tooth T3, which is a third tooth in this example, is connectible to the winding section −V21 of the second stator winding 32*b* wound on the tooth T2, which is a second tooth adjacent in the circumferential direction. In such manner, a bridge wire for establishing a connection between the two slots 35 at the coil ends can be shortened, thereby connection therebetween is made easy and is reducible in size.

In the above embodiments, a modified configuration, in which the number of magnetic poles is "20," the number of slots is "18," and the current phase difference "β" between the first inverter circuit 51 and the second inverter circuit 52 is "20 degrees" for having the total phase difference of "80 degrees," may also be used. An example of such arrangement of the winding sections is shown in FIG. 17.

In such case, as shown in FIG. 17, the first stator winding 32*a* wound on a third tooth is connectible to the first stator winding 32*a* wound on a next-to-adjacent one of the teeth T1 to T18 in the circumferential direction. For example, the winding section +U12 of the first stator winding 32*a* wound on the tooth T3, which is a third tooth in this example, is connectible to the winding section +U11 of the first stator winding 32*a* wound on the tooth T1, which is a next-to-adjacent first tooth in the circumferential direction.

Similarly, the second stator winding 32*b* wound on a third tooth is connectible to the second stator winding 32*b* wound on a next-to-adjacent one of the teeth T1 to T18 in the circumferential direction. For example, the winding section −W21 of the second stator winding 32*b* wound on the tooth T3, which is a third tooth in this example, is connectible to the winding section −W22 of the second stator winding 32*b* wound on the tooth T5, which is a next-to-adjacent second tooth in the circumferential direction. In such manner, a bridge wire for establishing a connection between the two slots 35 at the coil ends can be shortened, thereby connection therebetween is made easy and is reducible in size.

In the above embodiments, a modified configuration, in which the number of magnetic poles is "20," the number of slots is "18," and the current phase difference "β" between the first inverter circuit 51 and the second inverter circuit 52 is "20 degrees" for having the total phase difference of "40 degrees," may also be used. An example of such arrangement of the winding sections is shown in FIG. 17.

In such case, as shown in FIG. 17, the first stator winding 32*a* wound on a third tooth is connectible to the first stator winding 32*a* wound on the adjacent one of the teeth T1 to T18 adjacent in the circumferential direction. For example, the winding section −W11 of the first stator winding 32*a* wound on the tooth T3, which is a third tooth in this example, is connectible to the winding section +W12 of the first stator winding 32*a* wound on the tooth T4, which is a first tooth adjacent in the circumferential direction.

Similarly, the second stator winding 32*b* wound on a third tooth is connectible to the second stator winding 32*b* wound on the adjacent one of the teeth T1 to T18 adjacent in the circumferential direction. For example, the winding section +U22 of the second stator winding 32*b* wound on the tooth T3, which is a third tooth in this example, is connectible to the winding section −U21 of the second stator winding 32*b* wound on the tooth T2, which is a second tooth adjacent in the circumferential direction. In such manner, a bridge wire for establishing a connection between the two slots 35 at the coil ends can be shortened, thereby such a connection is made easy and is reducible in size.

In the above embodiments, a modified configuration, in which the number of magnetic poles is "20," the number of slots is "18," and the current phase difference "β" between the first inverter circuit 51 and the second inverter circuit 52 is "40 degrees" for having the total phase difference of "80 degrees," may also be used. An example of such arrangement of the winding sections is shown in FIG. 17.

In such case, as shown in FIG. 17, the first stator winding 32*a* wound on a third tooth is connectible to the first stator winding 32a wound on the next-to-adjacent one of the teeth T1 to T18 in the circumferential direction. For example, the winding section +W11 of the first stator winding 32a wound on the tooth T2, which is a third tooth in this example, is connectible to the winding section +W12 of the first stator winding 32a wound on the tooth T4, which is a next-to-adjacent first tooth in the circumferential direction.

Similarly, the second stator winding 32b wound on a third tooth is connectible to the second stator winding 32b wound on a next-to-adjacent one of the teeth T1 to T18 in the circumferential direction. For example, the winding section +V21 of the second stator winding 32b wound on the tooth T2, which is a third tooth in this example, is connectible to the winding section +V24 of the second stator winding 32b wound on the tooth T18, which is a next-to-adjacent second tooth in the circumferential direction. In such manner, a bridge wire for establishing a connection between the two slots 35 at the coil ends can be shortened, thereby such a connection is made easy and is reducible in size.

In the above embodiments, a modified configuration, in which the number of magnetic poles is "20," the number of slots is "18," and the current phase difference "β" between the first inverter circuit 51 and the second inverter circuit 52 is "40 degrees" for having the total phase difference of "40 degrees," may also be used. An example of such arrangement of the winding sections is shown in FIG. 17.

In such case, as shown in FIG. 17, the first stator winding 32a wound on a third tooth is connectible to the first stator winding 32a wound on the adjacent one of the teeth T1 to T18 adjacent in the circumferential direction. For example, the winding section −U12 of the first stator winding 32a wound on the tooth T2, which is a third tooth in this example, is connectible to the winding section +U11 of the first stator winding 32a wound on the tooth T1, which is a first tooth adjacent to the tooth T2 in the circumferential direction.

Similarly, the second stator winding 32b wound on a third tooth is connectible to the second stator winding 32b wound on one of the teeth T1 to T18 adjacent in the circumferential direction. For example, the winding section −U21 of the second stator winding 32b wound on the tooth T2, which is a third tooth in this example, is connectible to the winding section +U22 of the second stator winding 32b wound on the tooth T3, which is a second tooth adjacent in the circumferential direction. In such manner, a bridge wire for establishing a connection between the two slots 35 at the coil ends can be shortened, thereby connection therebetween is made easy and is reducible in size.

In the above embodiment, the number of magnetic poles may be (18±4)×m (i.e., m is an integer of 1 or more) and the number of slots may be 18×m. Further, the number of magnetic poles may be (18±2)×n (i.e., n is an integer of 1 or more) and the number of slots may be 18×n. Note that, when the number of magnetic poles is (18±4)×m (i.e., m is an integer of 1 or more) and the number of slots is 18×m, as described above with reference to FIG. 9, the electromagnetic force has a peak at every 90 degrees, thereby a balance of force is achievable, and noise and vibration are suppressible.

In the above embodiment, although the current phase difference "β" between the first inverter circuit 51 and the second inverter circuit 52 may preferably be "20 degrees" or "40 degrees," the difference may also be within a range of 15 to 25 degrees or within a range of 35 to 45 degrees, respectively.

In the above embodiment, although the total phase difference between the first stator winding 32a wound on the third teeth and the second stator winding 32b wound on the third teeth may preferably be "40 degrees" or "80 degrees," the difference may also be within a range of 32 to 48 degrees or within a range of 72 to 88 degrees, respectively.

In the above embodiment, the motor 10 is not only limited to a radial-gap motor, but may also be an axial-gap motor, for example. The motor 10 may also be a reluctance motor or an induction motor.

In the embodiments and the modifications described above, the total phase difference (i.e., a magnetomotive force total phase difference) between the magnetomotive force generated by the winding section of the first stator winding 32a wound on the third tooth and the magnetomotive force generated by the winding section of the second stator winding 32b wound on the same third tooth is set to be within a predetermined range. Instead of using the magnetomotive force total phase difference, a total phase difference (i.e., an electric current total phase difference) between the electric current flowing in the winding section of the first stator winding 32a wound on the third tooth and the electric current flowing in the winding section of the second stator winding 32b wound on the same third tooth may be used.

Note that the phase of the electric current flowing in the winding section is shifted by 180 degrees depending on the winding direction of the winding section. In other words, even for the same U-phase winding section, the electric current flowing in the "+" winding section and the electric current flowing in the "−" winding section have 180 degrees phase shift from each other, in terms of calculation of the phase difference.

For example, when the current phase difference "β" of the inverters is 20 degrees and the phase of the electric current flowing in the "+" part of the U-phase winding section is used as a reference phase "θ," the phase of the electric current flowing in the "−" part of the V-phase winding section has a phase shift of "θ−320," which is a total (i.e., addition) of "θ−120 (i.e., a phase shift of the V phase)−20 (i.e., based on the electric current phase difference β)−180 (i.e., a phase shift due to winding direction)."

What is claimed is:

1. A rotating electric machine comprising:
 a rotor having a plurality of magnetic poles whose polarities alternate in a circumferential direction;
 a multi-phase stator winding; and
 a stator with a stator iron core having a plurality of circumferentially-arranged teeth around which the stator winding is wound, respectively, wherein
 (a) the stator winding includes a first stator winding supplied with a three-phase current from a first inverter and a second stator winding supplied with a three-phase current from a second inverter,
 (b) both of the three-phase currents supplied from the first and second inverters respectively have a predetermined current phase difference, and
 (c) a U-phase coil body Ua formed as the first stator winding in a U phase among the three phases wound around first teeth,
 a V-phase coil body Va formed as the first stator winding in a V phase among the three phases wound around the first teeth,
 a W-phase coil body Wa formed as the first stator winding in a W phase among the three phases wound around the first teeth,
 a U-phase coil body Ub formed as the second stator winding in a U phase among the three phases wound around second teeth, a V-phase coil body Vb formed as the second stator winding in a V phase among the three phases wound around the second teeth, a W-phase coil body Wb formed as the second stator winding in a W phase among the three phases wound around the second teeth, a U-phase coil body Uc formed as the first stator winding in any one phase among the three phases and the second stator winding in any one phase among the three phases wound around third teeth, a V-phase coil body Vc formed as the first stator winding in any one phase among the three phases and the second stator winding in any one phase among the three phases wound around the third teeth, and a W-phase coil body Wc formed as the first stator winding in any one phase among the three phases and the second stator winding in any one phase among the three phases wound around the third teeth are provided, and wherein (I-a) a total phase difference between a magnetomotive force generated by a winding section of the first stator winding wound around the third teeth and a magnetomotive force generated by a winding section of the second stator winding wound around the same third teeth, or (I-b) a total phase difference between an electric current flowing in a winding section of the first stator winding wound around the third teeth and an electric current flowing in a winding section of the second stator winding wound around the same third teeth is set so that (II-a) respective phase differences of magnetomotive forces (A) between the coil bodies Ua, Va, Wa and the coil bodies Uc, Vc, Wc in respective phases and (B) between the coil bodies Uc, Vc, Wc and the coil bodies Ub, Vb, Wb in respective phases are within a predetermined phase range of electric angle including 20 degrees, or (II-b) respective phase differences of magnetomotive forces (A) between the coil bodies Ua, Va, Wa and the coil bodies Ub, Vb, Wb in respective phases and (B) between the coil bodies Ub, Vb, Wb and the coil bodies Uc, Vc, Wc in respective phases are within a predetermined phase range of electric angle including 20 degrees.

2. The rotating electric machine of claim 1, wherein a number of turns of the first stator winding wound on the third teeth and a number of turns of the second stator winding wound on the third teeth are respectively set to be different from a number of turns of the first stator winding wound on the first teeth, and from a number of turns of the second stator winding wound on the second teeth, so that the magnetomotive force of each of the coil bodies Ua, Va, Wa, Ub, Vb, Wb, Uc, Vc, Wc is controlled to be within a predetermined amplitude range.

3. The rotating electric machine of claim 1, wherein the total phase difference is set to be in a range of 72 to 88 degrees in electric angle.

4. The rotating electric machine of claim 3, wherein a number of magnetic poles of the rotor is (18±4)×m (i.e., 'm' is an integer of 1 or more), and a number of slots between the teeth is 18×m.

5. The rotating electric machine of claim 3, wherein a number of magnetic poles of the rotor is (18±2)×n (i.e., 'n' is an integer of 1 or more), and a number of slots between the teeth is 18×n.

6. The rotating electric machine of claim 3, wherein when designating a number of turns of the first stator winding wound on the first teeth and a number of turns of the second stator winding wound on the second teeth as a number "Na" respectively, and designating a number of turns of the first stator winding wound on the third teeth and a number of turns of the second stator winding wound on the third teeth as a number "Nb" respectively, the numbers Na and Nb are set to satisfy a relationship of $1.4 \leq Na/Nb \leq 1.6$.

7. The rotating electric machine of claim 1, wherein a number of magnetic poles of the rotor is 14 or 22, a number of slots between the teeth is 18, and the total phase difference is 80 degrees in electric angle.

8. The rotating electric machine of claim 1, wherein a number of magnetic poles of the rotor is 16 or 20, a number of slots between the teeth is 18, and the total phase difference is 80 degrees in electric angle.

9. The rotating electric machine of claim 1, wherein the total phase difference is within a range of 32 to 48 degrees in electric angle.

10. The rotating electric machine of claim 9, wherein a number of magnetic poles of the rotor is (18±4)×m (i.e., 'm' is an integer of 1 or more), and a number of slots between the teeth is 18×m.

11. The rotating electric machine of claim 9, wherein a number of magnetic poles of the rotor is (18±2)×n (i.e., 'n' is an integer of 1 or more), and a number of slots between the teeth is 18×n.

12. The rotating electric machine of claim 9, wherein when designating a number of turns of the first stator winding wound on the first teeth and a number of turns of the second stator winding wound on the second teeth as a number "Na" respectively, and designating a number of turns of the first stator winding wound on the third teeth and a number of turns of the second stator winding wound on the third teeth as a number "Nb" respectively, the numbers Na and Nb are set to satisfy a relationship of $1.8 \leq Na/Nb \leq 2.0$.

13. The rotating electric machine of claim 1, wherein a number of magnetic poles of the rotor is 16 or 20, a number of slots between the teeth is 18, and the total phase difference is 40 degrees in electric angle.

14. The rotating electric machine of claim 1, wherein the three-phase current supplied from the first inverter and the three-phase current supplied from the second inverter have a phase difference in a range of 15 to 25 degrees or in a range of 35 to 45 degrees.

15. The rotating electric machine of claim 1, wherein an angle sensor is disposed on a rotating shaft of the rotating electric machine, and lead wires of the first stator winding connected to the first inverter and lead wires of the second stator winding connected to the second inverter are arranged in symmetry about an axis of the rotating shaft in terms of respective phases.

* * * * *